(12) United States Patent
Friedman

(10) Patent No.: US 11,794,798 B2
(45) Date of Patent: Oct. 24, 2023

(54) MECHANICAL HAND TRUCKS WITH ENHANCED STAIR CLIMBING AND DESCENDING CAPABILITY

(71) Applicant: Eliezer Friedman, Brooklyn, NY (US)

(72) Inventor: Eliezer Friedman, Brooklyn, NY (US)

( * ) Notice: Subject to any disclaimer, the term of this patent is extended or adjusted under 35 U.S.C. 154(b) by 0 days.

(21) Appl. No.: 17/944,375

(22) Filed: Sep. 14, 2022

(65) Prior Publication Data

US 2023/0219610 A1     Jul. 13, 2023

Related U.S. Application Data

(60) Provisional application No. 63/298,952, filed on Jan. 12, 2022, provisional application No. 63/322,709, filed on Mar. 23, 2022, provisional application No. 63/330,795, filed on Apr. 14, 2022.

(51) Int. Cl.
    *B62B 5/02*     (2006.01)
    *B62B 5/04*     (2006.01)
    *B62B 1/12*     (2006.01)

(52) U.S. Cl.
    CPC ............ *B62B 5/023* (2013.01); *B62B 1/12* (2013.01); *B62B 5/0404* (2013.01)

(58) Field of Classification Search
    CPC .......... B62B 5/023; B62B 5/0404; B62B 1/12
    See application file for complete search history.

(56) References Cited

U.S. PATENT DOCUMENTS 3,269,478 A * 8/1966 Joslyn ................ A61G 5/068
                                      280/5.2
8,764,027 B1 * 7/2014 Della Polla .............. B62B 5/02
                                      280/30

FOREIGN PATENT DOCUMENTS

CA         2035866 A1 * 8/1991

\* cited by examiner

*Primary Examiner* — Bryan A Evans
(74) *Attorney, Agent, or Firm* — Israel Nissenbaum; Yitzy Nissenbaum

(57) ABSTRACT

A hand truck having a frame with first and second ends and a handle adjacent the first end and a platform extending from the second end. Wheels adjacent the second end support the frame and platform for rolling movement. A lever member with first end pivotally connected to the frame at the first end and second free end. A position stabilizing member is pivotally connected to each side of the frame proximate the second end with each shoe assembly being pivotal to a support position extending below a respective wheel. The free end of the lever member is positioned against a surface and the frame pivoted thereabout with the shoe portion of each shoe assembly moving to the support position. An automatic braking system prevents unwanted downward movement. A repositioned lever member and multiple commonly hinged lever members allow for full stair lifting and elimination of the position stabilizing member.

25 Claims, 34 Drawing Sheets

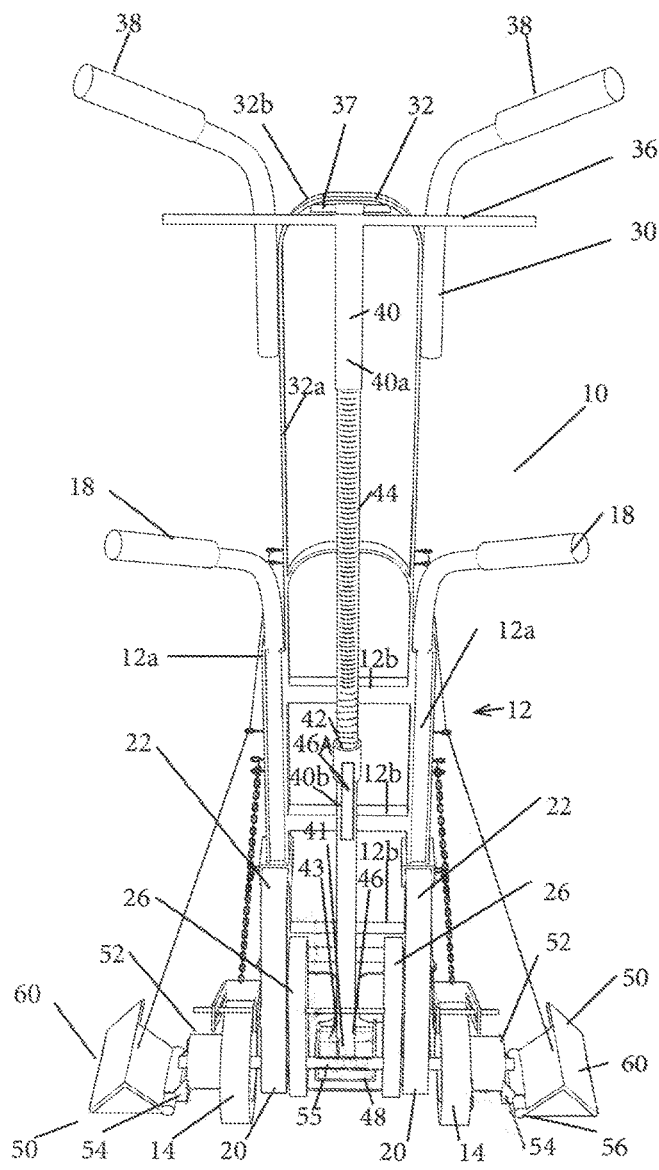
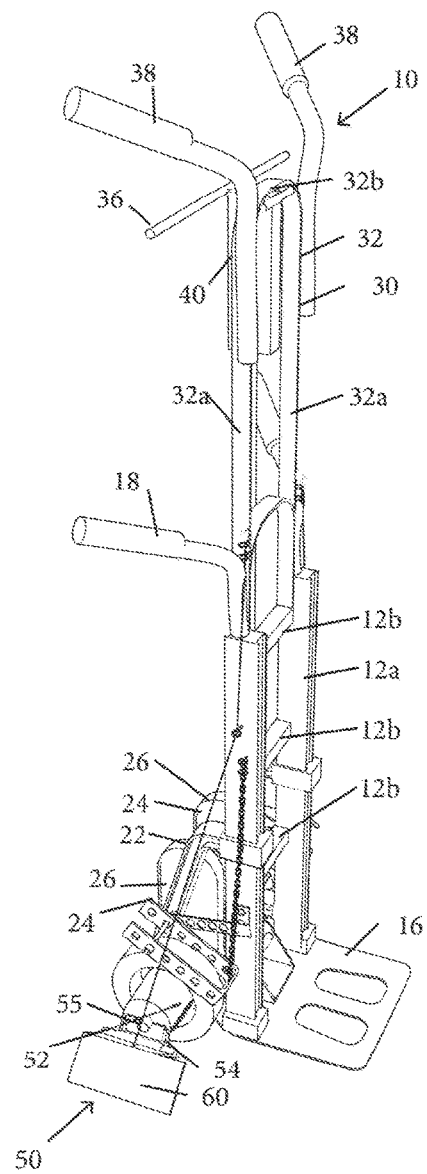
Fig. 2
Fig. 3

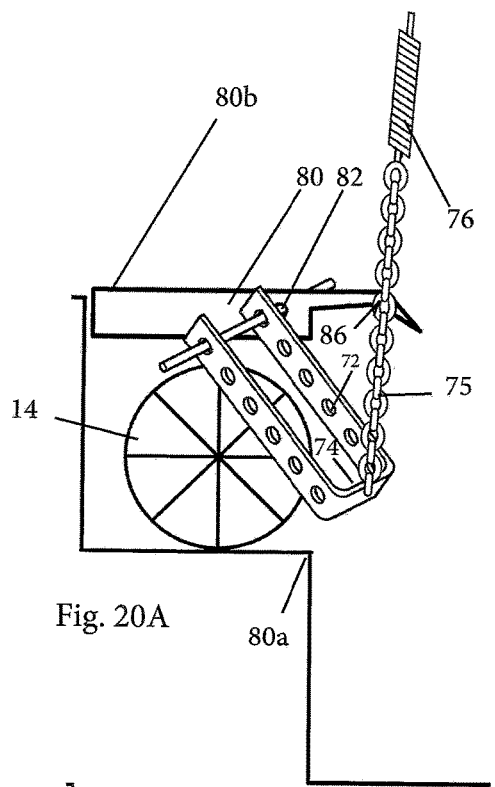
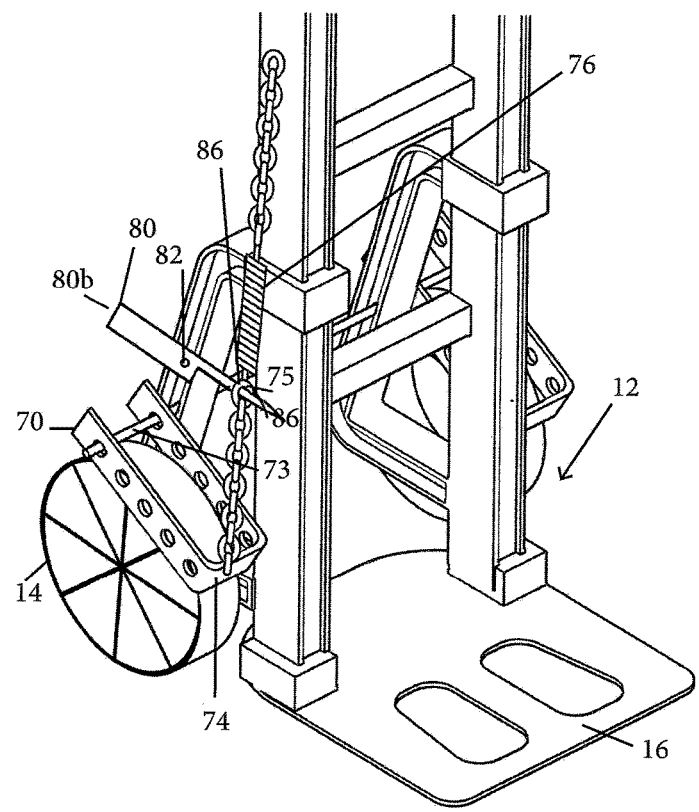
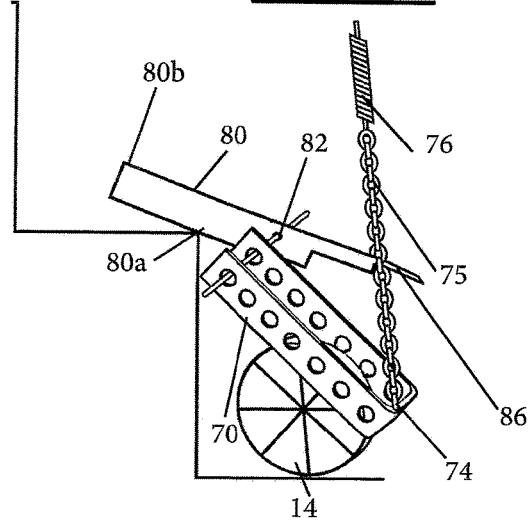
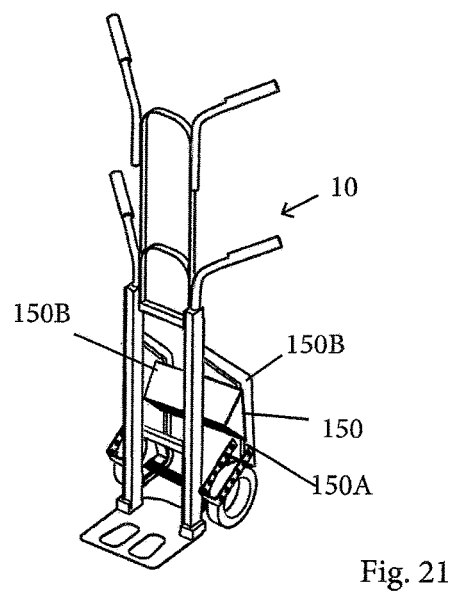
Fig. 20A
Fig. 20B
Fig. 20C
Fig. 21

MECHANICAL HAND TRUCKS WITH ENHANCED STAIR CLIMBING AND DESCENDING CAPABILITY

This application takes priority from provisional patent application Ser. Nos. 63/298,952; 63/322,709, and 63/330,795, filed on Jan. 12, 2022, Mar. 23, 2022 and Apr. 14, 2022 respectively, the disclosures of which are incorporated herein in their entirety by reference thereto.

FIELD OF THE INVENTION

This invention relates to mechanical hand trucks with enhanced stair climbing and descending capability particularly when used with heavy loads.

BACKGROUND

Hand trucks which are described as "stair climbing" are well known in the prior art. In many instances, stair climbing hand trucks rely upon rail-like members positioned behind a main set of wheels wherein such rail-like members allow a hand truck to be pulled and/or slid over the edge of a stair step until wheel engagement on the next flat surface or stair occurs. Examples of this type of stair climbing hand trucks are to be found in U.S. Pat. No. 4,046,391 to Restad et al; U.S. Pat. No. 4,570,953 to McPeak et al; U.S. Pat. No. 4,962,940 to Cuschera.

Although an improvement over the previous prior art, these disclosed improvements still require an inordinate amount of effort by the person using the hand truck in that most of the weight of the load must be carried by that person at certain points of the travel up and/or down the stairs when the main wheels are not on a horizontal surface. Others have attempted to overcome this problem with the use of motorized or electric features. However, adding motorized or electric features to a hand truck, significantly increases the cost of the hand truck, and also makes the hand truck dependent on the availability and expense of consumables such as fuel, battery or other source of electricity.

SUMMARY OF THE INVENTION

Accordingly, it is an object of the present invention to provide improved hand truck structures with advantageous immediately available mechanical features that can be engaged or disengaged, as needed, to assist the operator in raising a load up stairs, lowering a load down stairs, or performing traditional hand truck operations on a flat or inclined surface, without the use of motorized or electric features, by extending the technology of traditional hand trucks, so that it can be used on stairs with greater ease.

Generally, the present invention comprises a mechanical method and device for enhancing the capacity of wheeled hand trucks in being able to move large capacity weight loads particularly up stairs and controllably down stairs by utilizing one or more lever elements in sequentially related operated positioning or, in embodiments with a combination of adjustable length lever elements and intermediate weight supports or with height position stabilizers, while minimizing manual weight handling and a device for effecting such movement. An automatic, controlled braking system stabilizes the hand truck with minimization of unwanted movement both up and down stairs and provides additional control and minimizes effort. It is understood that while the hand truck device operates with mechanical load transport, control devices used in effecting the operation of the invention include both mechanical and electrical operations.

The method comprises the steps of:
a) providing a prior art hand truck with a mechanism at the back of the frame (in various embodiments, the mechanism is hingedly attached to the frame at or near the top or at or near the middle of the frame) configured to repeatedly be affected by a shift of a center of gravity of the load on the hand truck, wherein, when the mechanism is subjected to a pressure of applied weight resulting from the shift of the center of gravity, backward toward the handle, the hand truck is caused to move backward, thereby facilitating lifting of the hand truck. An embodiment of a mechanism affected by a shift of center of gravity comprises at least one integral hinged elongatable lever member having a free end configured to be moved rearwardly (relative to a carried load) and engaged with a higher, usually planar, surface such as a step of a stairway to effect a levered lifting with the shift of center of gravity,
b) depending on the positioning, extent of levered lifting and number of levering elements, as will be described, the hand truck is further optionally provided with an engageable and disengageable intermediate weight support or position stabilizer (particularly when levered lifting is in increments less than that of a stair riser height) which is deployable after initial levered lifting to permit the integral hinged lever member to be disengaged for elongation without downward movement, to provide subsequent additional levered lifting for clearance of a stair or step; and
c) particularly for controllable descending operations, and for stabilized lifting, providing the hand truck with an engageable and disengageable braking structure (preferably automatically operational) configured to retard downward or backward movement of the hand truck during upward movement of the hand truck for stability and to control downward movement.

Generally, use of the hand truck, as configured, in a first embodiment to move a load up stairs of a stairway is effected by the steps of:
i. moving wheels of the hand truck on a surface or planar area adjacent a first stair of a staircase, into proximity to a riser of the first stair (or otherwise bringing the hand truck adjacent the first stair);
ii. extending the mechanism, affected by a shift of center of gravity, such as an integral hinged elongatable lever member away from the inclined hand truck, with the free end brought into supporting engagement with a step section of a higher second stair and using the lever member as a lever to raise the load against the riser of the first stair,
iii. deploying (either automatically or manually) a load support structure to hold the load in place while the lever member is elongated for additional leveraged lifting capability;
iv. using the extended lever member to lever and lift the hand truck from its load support holding place to permit the wheels of the hand truck to move further upward and onto the step of the second stair;
v. releasing of the load support structure of its own volition (or with manual control) and returning the lever member to its original length; and
vi. repeating steps ii to iv until the hand truck clears the top stair and onto a landing and wherein the braking structure prevents unwanted back movement during the upward stair movement or with descending movement.

In at least one embodiment of a hand truck device, the present invention provides a hand truck including a frame having a first end and a second end with at least one handle adjacent the first end of the frame and at least one platform or supporting element extending from the frame proximate the second end. As is typical, at least two wheels adjacent the second end of the frame are configured to support the frame and platform for rolling movement. It is understood that wheels per se are not required for the invention (except for brake deployment) but are simply typical of existing hand trucks (the following discussion refers to "wheels" with such convention). The new hand truck has a lever member (comprising a single or multiple levering elements) which has a first end pivotally connected to the frame proximate the frame upper or middle to lower section and with a second free end.

Where the lever member deployment effects a partial stair lifting, an engageable shoe assembly is pivotally connected to each side of the frame adjacent the second end with each shoe assembly configured such that a shoe portion thereof is pivotal, when desired, to a support position extending below a respective wheel. It to be remembered therefore that for non-standard smaller stair height the use of the shoe assembly is unnecessary and raising of the load can proceed with only the lever member engaged and used as hereinabove described and possibly without lever elongation. Conversely with standard stair height, the operator has the option of disabling the lever and rely only on the step size reduction of the shoe assembly.

The lever member can be adjusted in various ways as to length and also includes a free end boot so that the free end of the lever member is flexible and can be configured to be positioned in various ways against a surface to provide leverage. The frame can be pivoted advantageously, when required, such that the engaged shoe portion of each shoe assembly moves to the load support position. Additional brake system features are described for wheeled hand trucks as aiding to safely and controllably raise and lower a load on stairs. In addition, the brake system includes a stabilizer mechanism that controls the brake during descending, after landing on each stair, so that it automatically brakes the hand truck. This prevents the hand truck from sliding down the stairs. It then releases the brake to allow the hand truck to continue moving down.

The hand truck device accordingly comprises, in an embodiment, a wheeled hand truck comprising:
a) a frame having a first end and a second end;
b) at least one handle adjacent the first end of the frame, usually extending or accessible from a back of the frame;
c) at least one platform or supporting element extending from a front of the frame, proximate the second end, and configured for supporting a load;
d) optionally, at least two wheels adjacent the second end of the frame and configured to support the frame and platform for rolling movement (external or other means are included herein for movement to a lifting or descending site);
e) a mechanism at the back of the frame configured to repeatedly be affected by a shift of a center of gravity of the load on the hand truck, wherein, when the mechanism is subjected to a pressure of applied weight resulting from the shift of the center of gravity, backward toward the handle, the hand truck is caused to move backward, thereby facilitating lifting of the hand truck, and
f) a stabilizing support structure configured to support and stabilize the hand truck and a load carried thereby in a lifted position while the center of gravity is returned.

In a further version of this embodiment the hand truck device comprises:
a. an integral levering member, configured to be affected by a shift of center of gravity, which is deployable into a levering position for engaging with a higher level enabling the levered lifting of the hand truck and a load carried thereby from a first wheel support surface to a lifted position;
b. a stabilizing support structure configured to support and stabilize the hand truck and a load carried thereby in the lifted position while the integral levering member is lengthened with a releasable lengthening element for a second levered lifting to a second wheel support surface; and
c. a braking mechanism which engages wheels of the hand truck to prevent downward movement without impeding upward movement of the hand truck, wherein the stabilizing support structure does not impede movement of the hand truck in an upward direction and wherein the integral levering member, the releasable lengthening element and stabilizing support structure are disengageable for repeated levering, lifting and supporting operations.

It is a further aspect of the invention wherein the braking system and mechanism is independently generally utilizable as a safety or controlling device with many other moving wheeled applications such as wheel chairs, bicycles, shopping carts, baby carriages, strollers and the like.

In a further embodiment, a series of lever elements are used sequentially to effect a hand truck lifting for an entire riser distance, wherein the use of the support stabilizer is obviated.

This embodiment provides for a heavy load lifting hand truck to effect a full leveraged lifting to a riser height without necessity for an intermediate position stabilizing member or supporting shoe element as in the first embodiment. A further object is to provide the heavy load lifting hand truck with a structure wherein a load is lifted from step to step in a continuous levered pivoting.

This embodiment comprises a method and device for closely sequentially effecting multiple levered lifting sufficient to clear the height of a stair riser with multiple adjacent but hingedly separate lever members of different adjustable (as required) lengths. The lever members are sequentially hingedly attached to the upper portion of the hand truck frame in a manner similar to that of the single lever member of the first embodiment, with a common focal attachment. The height differential of the lever members is about the height of a typical riser. The lever member closest to the hand truck is the longest and is configured to engage the level surface of a first step adjacent the initial hand truck position and extends to just above the first riser height from a base level on which the hand truck is resting. The second lever member is shorter than the first by about a height of a stair riser and extends about 2.25 step riser heights from the base level on which the hand truck is resting and a third lever member is shorter than the second lever member by about an additional height of a stair riser, about 3.5 step riser heights from the base level.

With such arrangement, the first lever member is hingedly moved backward from the hand truck toward the hand truck user in a manner, as in the first embodiment, to engage the flat surface of an adjacent stair with concomitant levered lifting of the load for a distance equivalent to a portion of the stair riser height. The hinged second shorter lever member is then engaged with a next successive stair flat surface and the second lever member is used to pivot the hand truck and load up an additional distant of the riser height. The next successive third shortest lever member is then similarly deployed against a next successive stair flat surface where it is used to provide leverage pivoting to bring the load to a height equal to the riser whereby the hand truck is able to be rolled or moved onto the flat surface of the first step. With such clearance, the respective lever members become disengaged from the step surfaces and collapse onto each other for a next deployment. The respective lever members, while hingedly separated are controllably loosely attached with attachment members such as a spring to keep them at least slightly separated and with an attachment member such as a chain to prevent them from becoming overly separated.

In this embodiment, the height of the hand truck is increased from that of a standard hand truck in order to accommodate the need for a user or operator to be more comfortable with the additional lever placements. Though two lever members could be used to effect a full riser height lifting it may entail an awkward modification of the hand truck. Three lever members provide the structural configuration for rapid riser height lifting. It is understood however, that less and additional lever members are within the purview of the invention.

In a version of the embodiment, the handles are attached to the hand truck frame with a telescopic arrangement whereby the handles, with the focal attachment of lever members, may be moved and locked into a normal and an extended position. Alternatively, if desired, the telescopic arrangement is with engaging gear teeth such that, when a desired height is reached, the gears are meshed and locked into the desired height position To accommodate various conditions of different riser heights, missing stairs and deployment at the top of the stairs (where engagement surfaces are missing or limited), the lever members are provided with length varying structures as opposed to the single length boot of the single lever member in the hand truck of the first embodiment. In a further version of the embodiment, the varying length of the lever member may be effected with the lever members being comprised of telescopic elements movable with engaged gears. When a desired length is attained the meshed gears are locked into position. Generally, the typical relative heights of the three lever members, for positioning and effecting the segmented lifting is about 1 stair riser height (typically 8") for the first lever member (closest to the hand truck), above the base level on which the hand truck is resting; about an additional 1¼ stair riser height shorter (to accommodate angled positioning) for the second lever member (about 2¼ above the base level); and about an additional 1% stair riser height shorter for the third lever member (about 3% above the base level). Changes in height or length of the lever members should be effected without disturbing the other lever members.

The hand truck for facilitated lifting of loads up stairs, each having a riser height, in the various embodiment generally comprises:
  a) a frame having a first end and a second end;
  b) at least one handle adjacent the first end of the frame;
  c) at least one platform or supporting element extending from a front of the frame, proximate the second end, and configured for supporting a load; and
  d) optionally at least two wheels adjacent the second end of the frame and configured to support the frame and platform for rolling movement.

In accordance with the embodiments, the hand truck further comprises a levering mechanism at the back of the frame configured to be deployed to be affected by a shift of a center of gravity of the load on the hand truck. Thus, when the mechanism is subjected to a pressure of applied weight resulting from sequential shifts of the center of gravity, backward toward the handle, the hand truck is caused to move backward, thereby facilitating lifting of the hand truck up above a full riser height and movement of the hand truck with supported load to a next stair or supporting surface.

In a third embodiment, a dual lever element is configured and positioned on the frame of the hand truck to effect the lifting for an entire riser distance.

With this third embodiment, it is an object to further simplify a hand truck structure to provide a mechanical mechanism whereby a single continuous levered movement with two lever elements provides sufficient lift for a full stair height lift with a heavy load.

This embodiment comprises a hand truck having an upper lever element (with adjustable length or of a single standard length), hingedly attached, as in the prior embodiments, proximate to the upper end of the hand truck frame and handles. A second lever mechanism is hingedly attached to the hand truck frame at about one third of the height of a standard hand truck (the height position is however dependent on the span positioning of the second mechanism) of the hand truck frame or about the height of slightly more than three standard steps (about 26") from the base surface upon which the hand truck is supported. The second lever mechanism is comprised of a freely rotatable levering element of a length sufficient to be rotated and to extend to a rear end of a first step surface above the surface on which the hand truck is resting. The levering element is attached to a lifting element which lifts the levering element to a position whereby it can clear an edge of a proximate stair riser for deployment on a next step surface. When emplaced, the levering element is fixedly positioned into a one-way levering position. In one version of this embodiment, the levering element is hingedly attached to the lifting element with the latter being hingedly attached to the hand truck frame. In such embodiment, the lifting element and levering element provide a coextensive lever length with such fixed positioning.

In operation, the hand truck with load is brought proximate to a staircase. The levering element is folded and lifted above the height of the adjacent stair riser and the levering element is then fixedly positioned into a lever position and extended across the surface of the step above the riser to the end of the surface at the next following riser or adjacent thereto. The hand truck is then pivoted on the levering element until the upper lever element engages a step surface most often two steps above the engaging surface of the lower levering element (one or three steps are also possible but less often). The hand truck continues to be levered or pivoted on the upper lever element until the wheels or base of the hand truck clear the initial riser. Thereafter, the hand truck is straightened with a forward movement and the placement and levering operation is repeated for each step. At the top steps, after adjusting the length, the user simply moves backward on a landing to permit placement of the upper lever element.

The above objects, features and advantages of the invention will become more evident from the drawings and discussion in which:

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention in the drawings:

FIG. 2 is a rear elevation view of the hand truck of FIG. 1;

FIG. 3 is a right side perspective view of the hand truck of FIG. 1 with the left side being a mirror image thereof;

FIGS. 20A-C separately depict the brake system with a stabilizer that controls the brake with exploded view (20A), engaged view on the hand truck base (20B), and operational on stairs (20C); and FIGS. 21 and 21A-E depict a second embodiment of a temporary position stabilizing holding and support mechanism and its method of deployment;

DETAILED DESCRIPTION OF THE INVENTION

Figure 1:
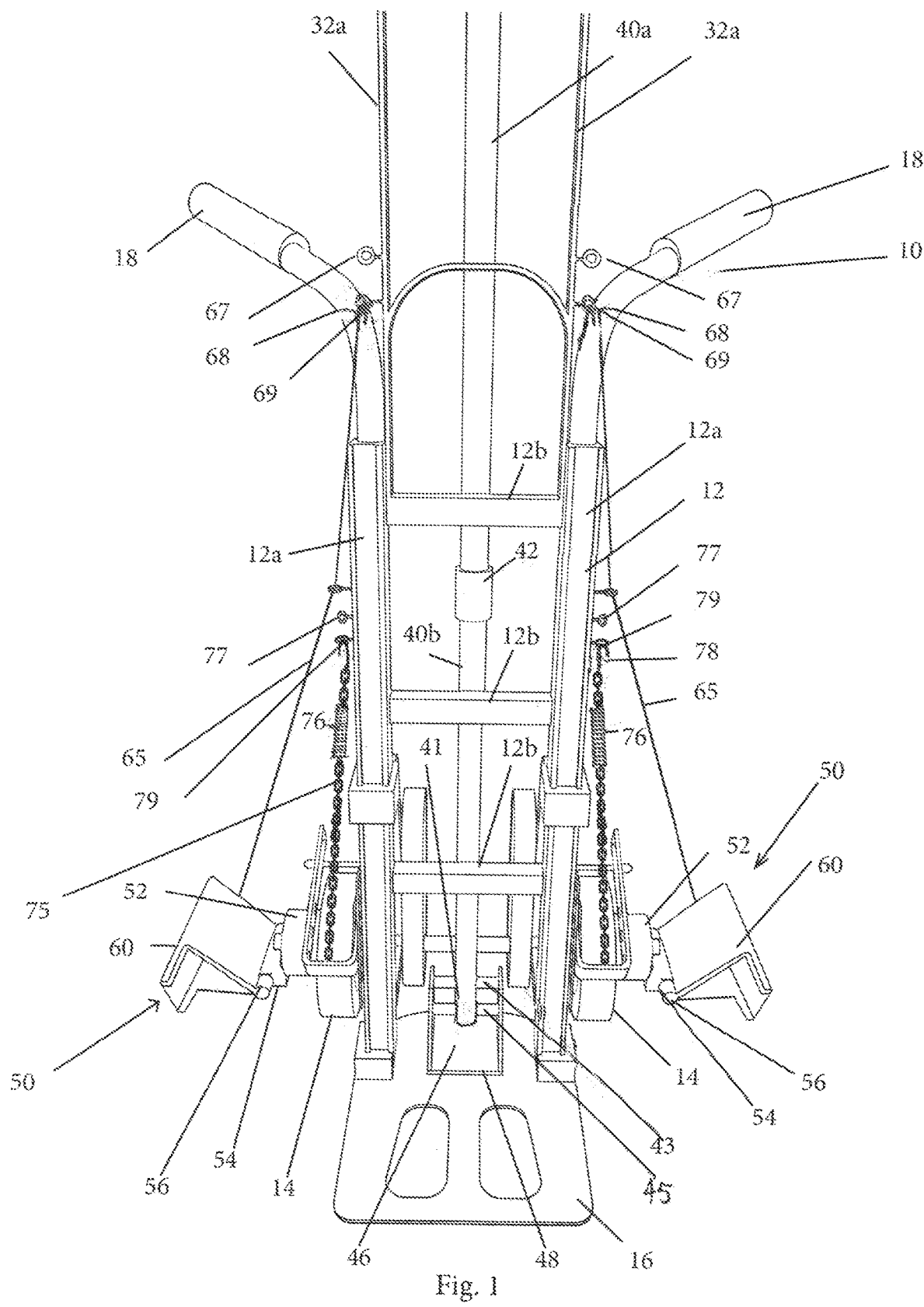
FIG. 1 is a front perspective view of the hand truck in accordance with an embodiment of the invention.
Figure 4:
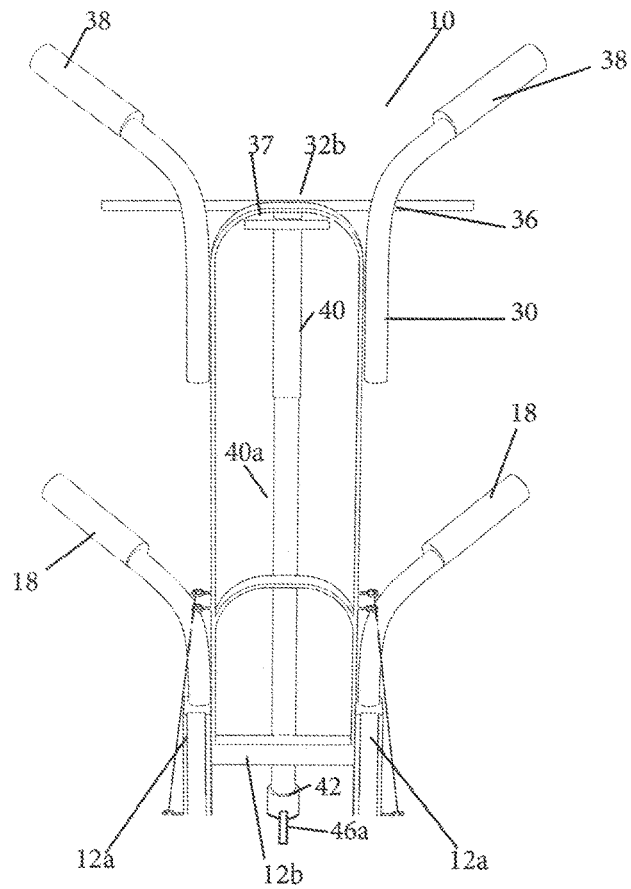
FIG. 4 is a front elevation view of an upper handle portion of the hand truck of FIG. 1.
Figure 5:
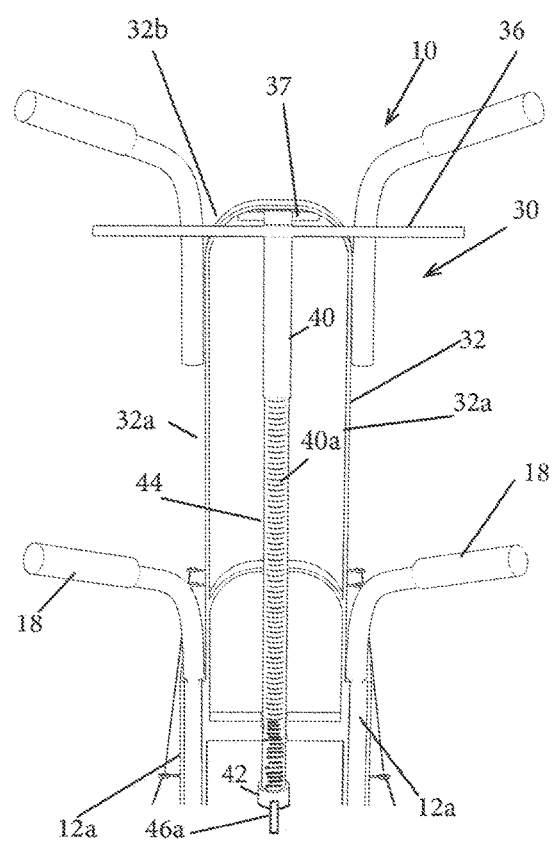
FIG. 5 is a rear elevation view of the hand truck of FIG. 1.
Figure 6:
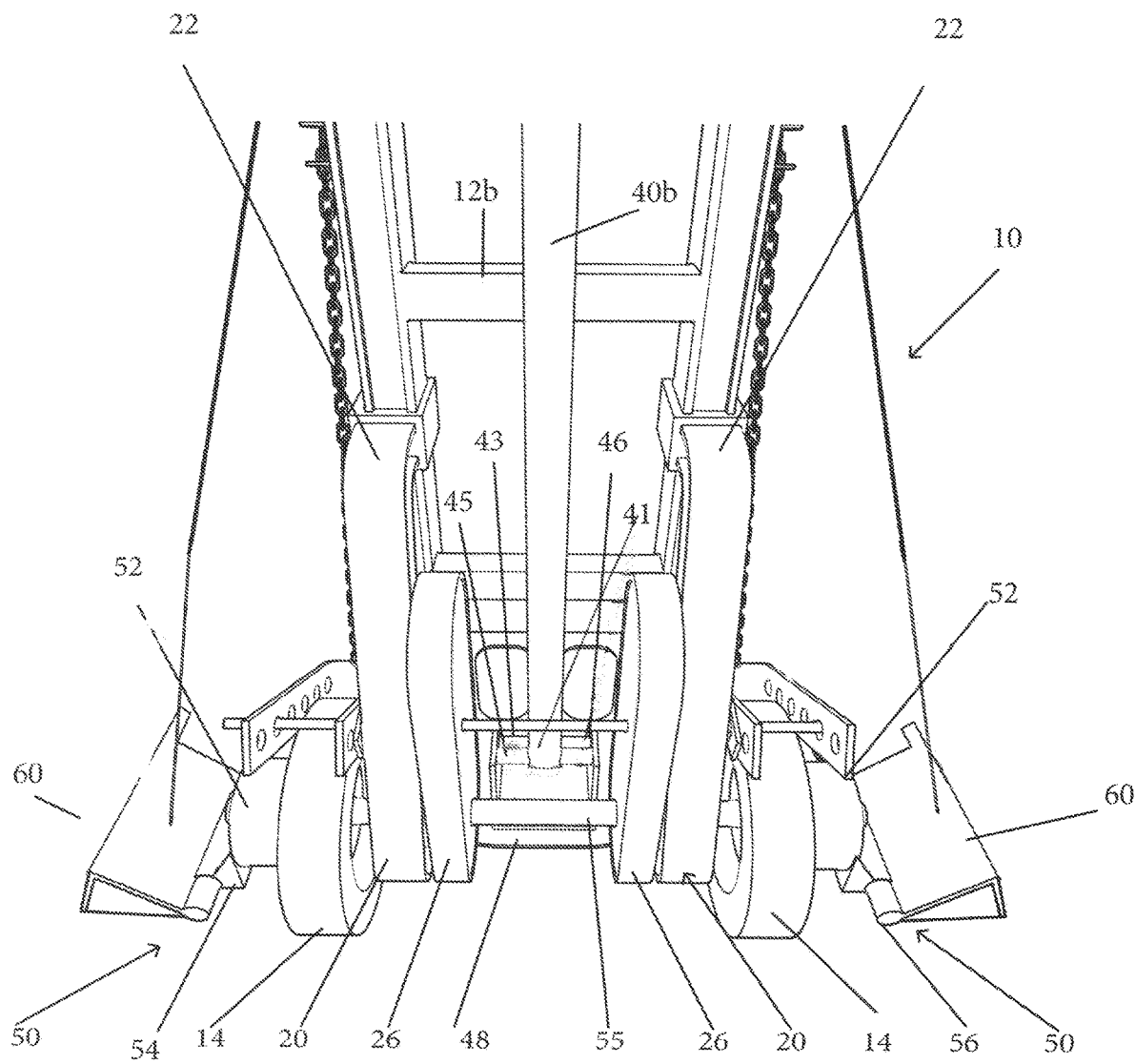
FIG. 6 is a rear perspective view of a lower portion of the hand truck of FIG. 1.

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Embodiment with Single Lever and Intermediate Support Mechanism

With reference to FIGS. 1-9, an exemplary stair climbing hand truck 10, in accordance with a first embodiment of the present invention will be described. Referring to FIGS. 1-4, the shown hand truck 10 includes a typical generally ladder-like main frame 12. The main frame 12 includes at least two uprights 12a, one on either side of the frame 12, and a plurality of cross members 12b extending generally perpendicularly between the uprights 12a. Proximate a first end of the frame 32b are a pair of handles 38 to enable grasping of the hand truck 10 during wheeling of the hand truck 10 and particularly while moving up and down stairs. An additional lower set of handles 18 is also provide for usage when needed. Though not shown, pairs of handles may be replaced by a functionally equivalent single handle set, such as of an are shape, extending across the width of the frame and capable of being gripped by two hands. At least two wheels 14 are shown as being rotatably engaged with the frame 12 proximate a second end of the frame 12. Preferably, the wheels 14 extend outwardly from the uprights 12a of the frame 12 and enable the hand truck 10 to be rolled along a surface (not shown). Extending outwardly from a front of the frame 12 proximate the second end is a lifting surface or platform 16. Preferably, at least a portion of the platform 16 extends generally perpendicularly in front of the frame 12 to enable the carrying and transportation of an object such as a box (not shown).

With reference to FIGS. 2, 3, 6 and 7, optionally a pair of standard climbing assemblies 20 are supported on the rear side of the second end of the frame 12. Each standard climbing assembly 20 includes a secondary frame member 22 extending from a respective upright 12a. A track 24 is supported by each secondary frame member 22 with a continuous belt 26 extending about the track 24. Bearings 27, or the like, extend between the track 24 and the belt 26 such that the belt 26 is moveable around the track 24. When the hand truck 10 is tilted against a stair tread or the like, the standard climbing assembly 20 aids the hand truck 10 in moving relative to the belts 26 contacting the tread. In certain embodiments, the secondary frame members 24 and continuous belts 26 may be integral with or in place of standard climbing assemblies 20. This portion of the hand truck 10, other than the double set of handles, is generally as described in the above-identified prior art devices. However, such a device still requires an inordinate amount of effort by the person using the hand truck in that most of the weight of the load must be carried by that person at certain points of the travel up and/or down the stairs when the main wheels are not on a horizontal surface. The following described lever assembly 30 and shoe assemblies 50 assist with movement of the hand truck 10 up stairs or the like. A prior art hand truck may be modified to add the lever assembly 30 and/or shoe assemblies 50 or the hand truck 10 may be manufactured as a uniform device with preferably both the lever assembly 30 and shoe assemblies 50 incorporated directly with the frame 12, etc.

Referring to FIGS. 1-6, a lever assembly 30 in accordance with an embodiment of the invention will be described. In the present embodiment, the lever assembly 30 includes a lever frame 32 which extends from the main frame 12 with a pair of uprights 32*a* and at least one cross member 32*b*. A pair of pivot handles 38 extend from the lever frame 32 and are configured to pivot the hand truck 10 relative to a lever member 40 which is pivotally attached to the cross member 32*b* at a hinge 37. While the present embodiment includes the lever frame 32 and pivot handles 38, it is recognized that the lever member 40 may alternatively be hinged directly to one of the cross members 12*b* of the main frame 12 and the main handles 18 be utilized for pivoting. That is, the main frame 12 may define the entire frame as opposed to the main frame 12 and lever frame 32 defining the entire frame.

The lever member 40 preferably has first and second tube members 40*a* and 40*b* which are telescopingly interconnected at a lockable junction 42. In the present embodiment, a toothed bar 44 extends along the tube 40*a* and is engaged by a handle 46*a* supported by the junction 42. The handle 46*a* is moveable between an unlocked position wherein it does not engage the toothed bar 44 and the tubes 40*a* and 40*b* are axially moveable relative to one another to adjust the length of the lever member 40 and a locked position wherein a portion of the handle 46*a* engages the teeth of the toothed bar 44 and thereby locks the relative axial positions of the tubes 40*a* and 40*b* and thereby fixes the length of the lever member 40. A lever handle or cross bar 36 extends from the lever member 40 which may be utilized to control pivoting of the lever member 40 without letting go of the handles. Preferably the lever handle 36 is proximate the pivot handles 38 so a user can move easily the fingers between the handles 36, & 38, during a climb as will be described hereinafter. While the present embodiment includes a toothed bar 44, it is recognized that the telescopingly interconnected tube members 40*a* and 40*b* may be affixed by any lockable, telescoping mechanisms that are easy to adjust during operation, such as clamping or ratcheting locks or pins, and also any other length adjustable mechanism can be used as well. Further when the needed lever length is known, one full length lever with a boot may be sufficient for most stair conditions. It is noted that with standard stair dimensions, in one embodiment, the hand truck frame is a standard height of about 60" with the lever length reaching between about 41 inches to about 60 inches.

A free end 41 of the lever member 40 is extended and pivotally connected to a boot 46 via a pivot pin 43. The pin 43 preferably extends through an axial slot 49*a* (see FIG. 6, and FIGS. 19A-E) through the free end 41 such that the boot 46 is both pivotally and axially moveable relative to the lever member 40. A second pin 45 extends across the boot 46 and is configured to engage a transverse notch 49 in the free end 41 of the lever member 40 to lock the lever member 40 and boot 46 in axial alignment and prevent pivoting therebetween, as will be described hereinafter. The free end of the boot 46 defines a contact surface 48 which preferably should be of anti-slip material such as rubber.

Referring to FIGS. 6-9, an exemplary shoe assembly 50, in accordance with an embodiment of the present invention, will be described. Each shoe assembly 50 includes a support block 52 which is configured to rotate relative to the main frame 12. In the illustrated embodiment, a common axle 55 extends through each wheel 14 and each support block 52. As such, the weight of the hand truck 10 is passed from the main frame 12 through the axle 55 to either the wheels 14 or the support blocks 52, and thereby the shoe assemblies 50, as will be described hereinafter.

In stair climbing embodiments of the present invention, it is sometimes desirous to stack the load being carried vertically to raise the center of mass of the load and thereby increase leverage with the lever member 40. Accordingly, in certain embodiments for climbing stairs, it is preferable for the center of mass of the load being carried to be as high and as close as possible to frame 12 to maximize the benefits of the present invention.

A connection bracket 54 is secured to each support block 52 and is configured to rotate therewith. A hinge 56 extends between the connection bracket 54 and a respective shoe 60. Each shoe 60 includes a support frame 62 and a contact surface 64. In the illustrated embodiment, the support frame 62 has a triangular configuration with a central support plate 63 (see FIG. 9), but it may have other configurations which are suitable in supporting the weight of a loaded hand truck 10. The support block 52, the bracket 54 and the shoe 60 are configured such that when the shoe contact surface 64 engages a surface, the wheel 14 is supported spaced from the surface. As one example, the wheel 14 may be supported about 4 inches from the surface which would be about half of the standard stair riser height. It is to be remembered therefore that for non-standard smaller stair height the use of the shoe assembly is unnecessary and raising of the load can proceed with only the lever member engaged and used as hereinabove described. Conversely with standard stair height, the operator has the option of disabling the lever and relying only on the step size reduction of the shoe assembly.

Figure 9:
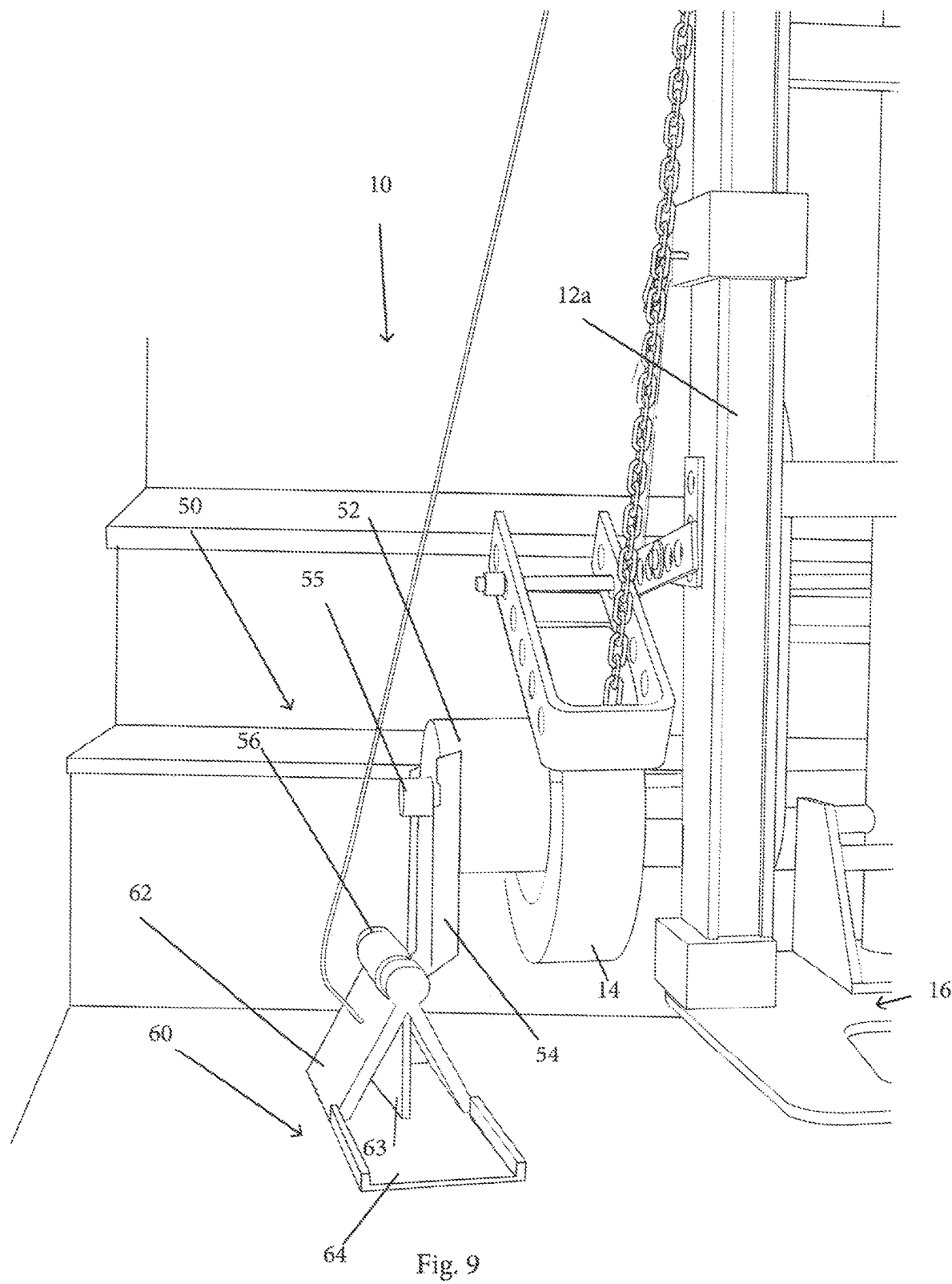
FIG. 9 is a front perspective view of the exemplary brake and shoe assembly as the hand truck has been moved up a ½ riser of a step of a staircase.
Figure 18:
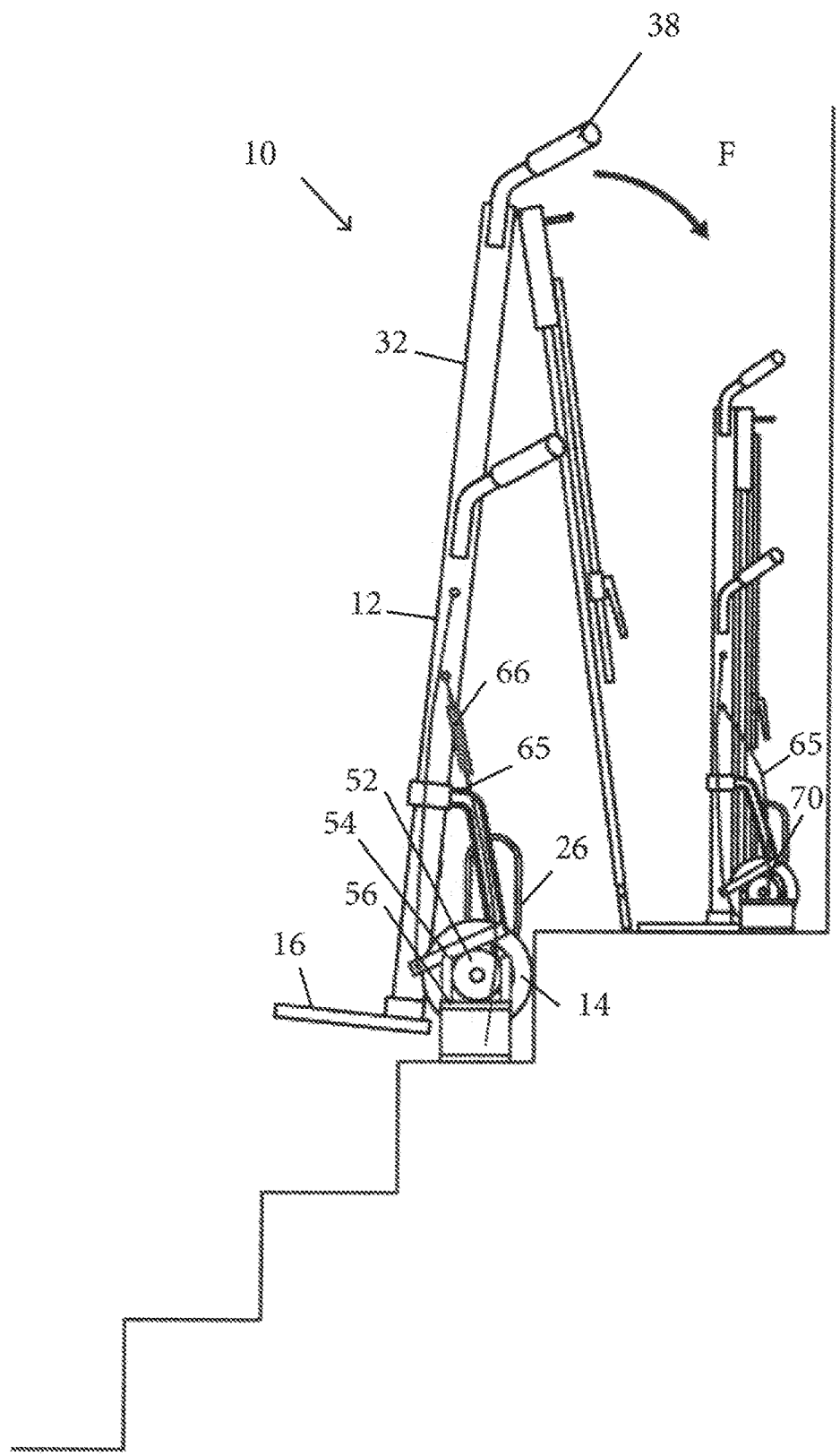
FIG. 18 is a side elevation view illustrating one operational method of lever positioning and sequential movement of an exemplary hand truck from a staircase to a landing in accordance with an embodiment of the invention.
Figure 19A:
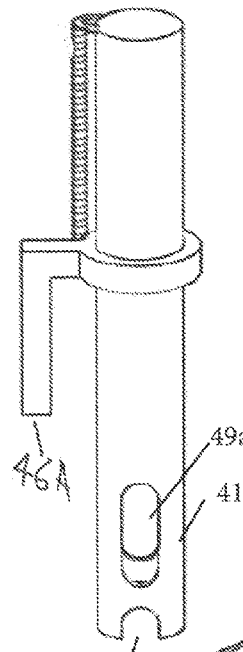
FIGS. 19A-E depict the flexible boot and lever member separated (19A) as connected in a free state (19B), in an engaged state (19C), which stair guidance (19D), and as being engaged on stairs (19E) as configured and used to extend the free end of the lever member.
Figure 19B:
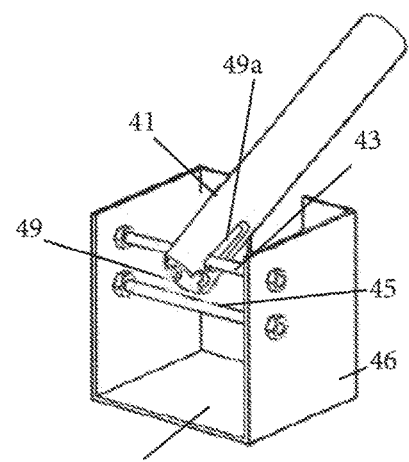
Figure 19C:
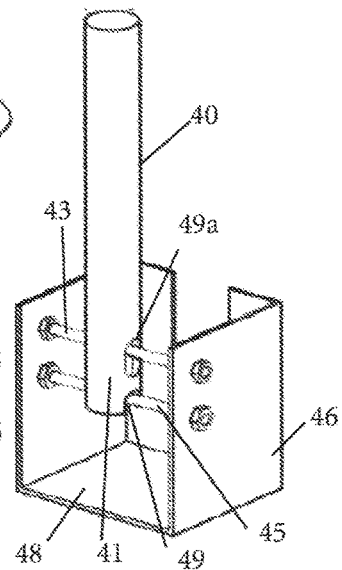
Figure 19D:
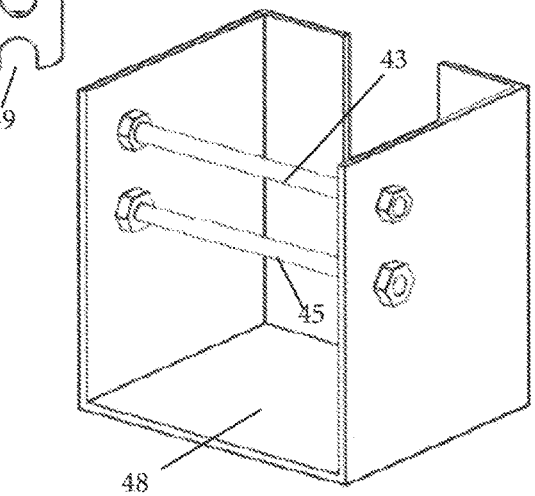
Figure 19E:
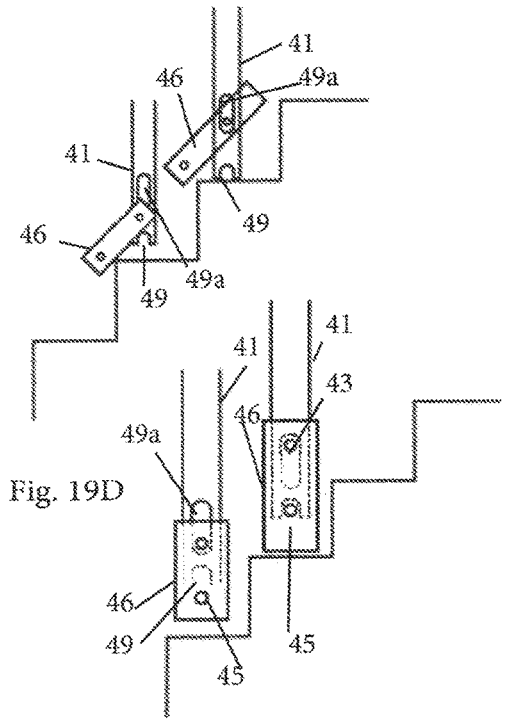

Each shoe 60 is preferably configured to pivot about hinge 56 from a non-engaging arrangement wherein the shoe 60 does not interfere (FIGS. 10 and 11) with normal operation of the wheels 14 to an engageable arrangement wherein the shoe 60 may rest on the surface (see for example FIG. 16) or be pivoted to the position illustrated in FIG. 9. Shoes 60 are in one of four positions, a) lockedly closed, b) in preparation for deployment, c) deployed, and d) hingedly moved out of the way to provide minimal profile and minimal interference with stair and landing structures In the illustrated embodiment, a cord 65 extends from each shoe 60 to a connector 68 (see FIG. 1) which may be connected to an upper connection point 67 on the main frame 12 or a lower connection point 69 on the main frame 12. When the cord 65 is connected to the upper connection point 67, the shoe 60 is maintained in the non-engaging arrangement and when the cord connector 68 is moved to the lower connection point 69, the shoe 60 is placed into the engageable arrangement. While cords are described herein, other mechanisms, for example, levers, pins, and the like, may be utilized to maintain the shoes 60 in the desired arrangement. In various embodiments, engagement of shoes 60 is an option and may be engaged based on stair height, weight of the load to be carried, and operational space. In some embodiments the cords include a spring 66 as part of their length to facilitate disengagement of the shoes as the load is moved from a position to a landing. With reference to FIG. 18, positioning of the cord 65 at a higher position provides for greater tension of spring 66 with increased stretching and the shoe will therefore automatically fold as the hand truck is lifted from the flat surface. The supported distance from the supporting surface of the shoe is generally the same as the distance for the boot. While using the hand truck on a flat surface, the shoes can be folded upward all the way in order not to interfere with the use.

Figure 8:
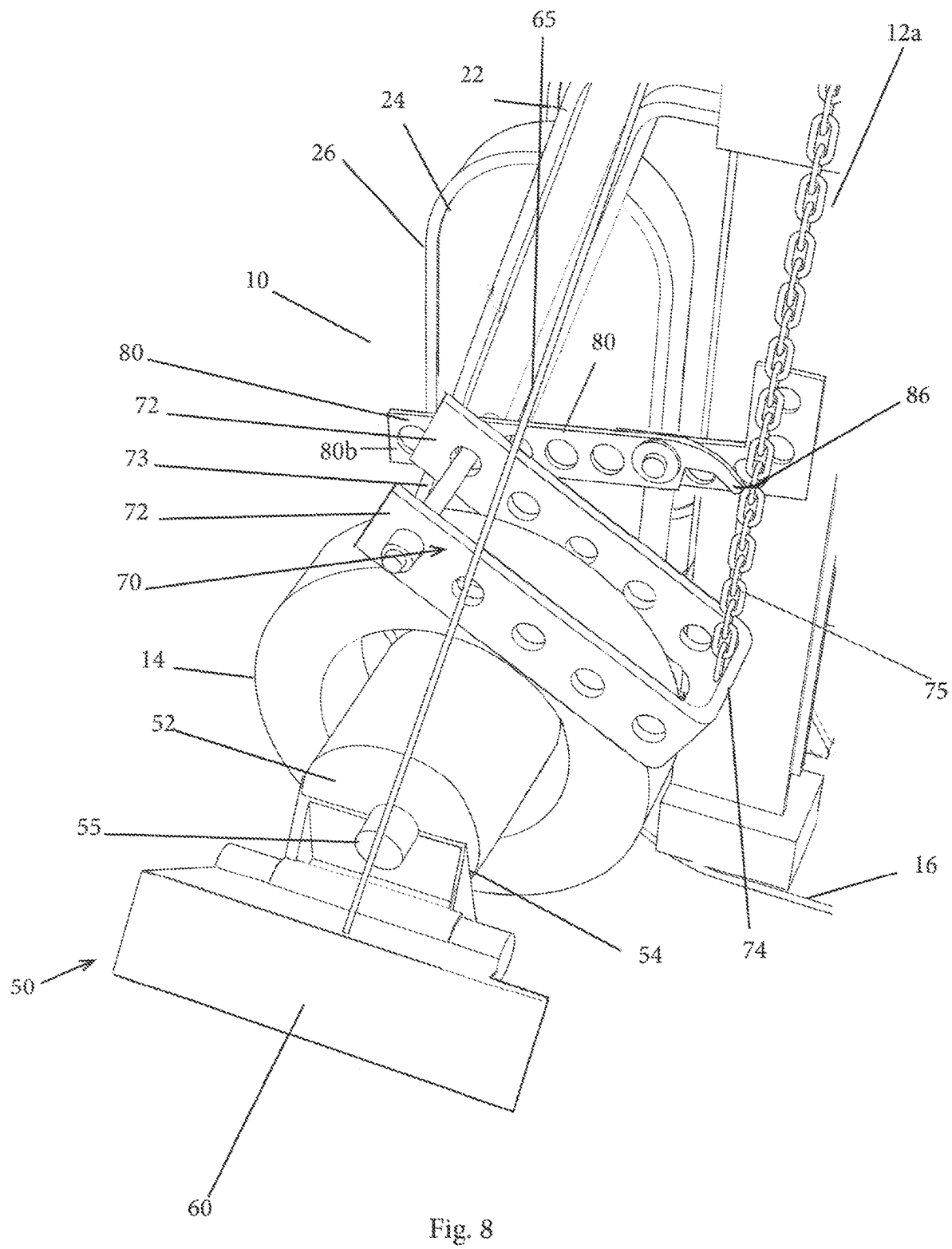
FIG. 8 is a perspective view of an exemplary brake, stabilizer and shoe assembly of the hand truck of FIG. 1.

The illustrated hand truck 10 also includes a brake member 70 and a stabilizer bar 80 associated with each wheel 14. Referring to FIG. 8, each brake member 70 has a U-shaped (which can be shaped differently according to the shape of the wheel) configuration with a pair of side members 72 and a contact surface 74 extending therebetween. The side members 72 are pivotally connected to the secondary frame 22 (or any bracket behind the wheels) via a pivot pin 73 such that the brake member 70 is pivotal between a disengaged position wherein the contact surface 74 is spaced from the wheel 14 and an engaged position wherein the contact surface 74 contacts the lower hemisphere of the wheel 14 (one of which should be of anti-slip material such as rubber) which therefore prevents rotation thereof in a forward direction, such as descending stairs, while permitting movement in a backwards direction, such as ascending stairs. In this manner, the brake member 70 prevents undesired forward movement, such as rolling down stairs. A chain 75 (which part of it may be a spring 76) extends from the brake member 70 proximate the contact surface 74 to a connector 78 (see FIG. 1) which may be connected to an upper connection point 77 on the main frame 12 or a lower connection point 79 on the main frame 12. When the chain 75 is connected to the upper connection point 77, the brake member 70 is maintained in the disengaged position and when the chain connector 78 is moved to the lower connection point 79, the brake member 70 is placed into the engaged position. In this manner, the brake member 70 may be engaged while climbing stairs and disengaged when forward movement is desired, such as going down stairs or on a flat surface. While chains are described herein, other mechanisms, for example, levers, pins and the like, may be utilized to maintain the brake member 70 in the desired position.

Figure 7:
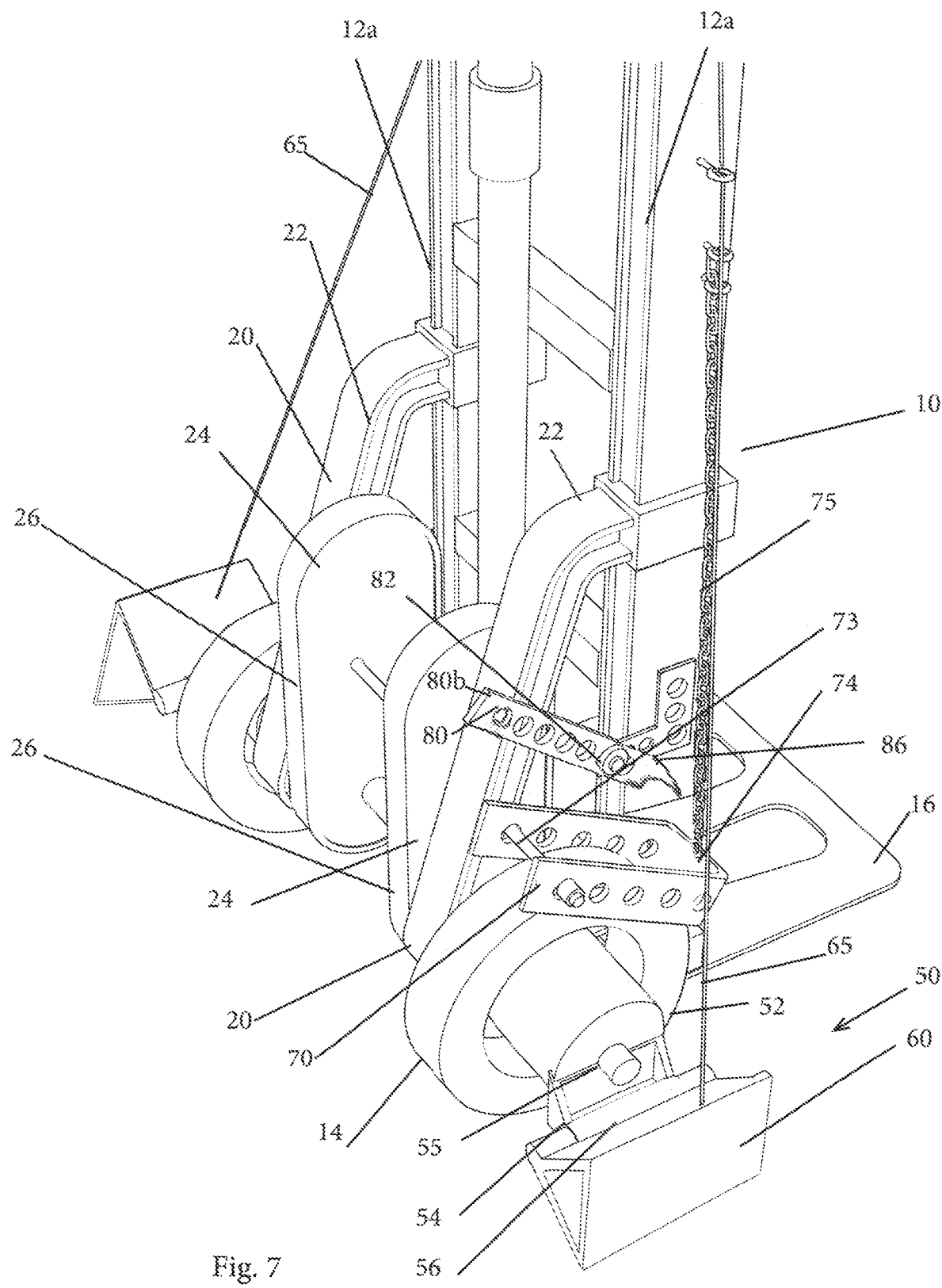
FIG. 7 is a right side perspective view of the lower portion of the hand truck of FIG. 1 with the left side being a mirror image thereof.

Referring to FIGS. 7, 8, and 20 A, B, & C, the stabilizer bar 80 is pivotally connected to the main frame 12 at pivot point 82. The stabilizer bar 80 includes a notch 86 (used only when descending stairs) which can be engaged to the brake member chain 75. Engagement of the back 80b of stabilizer bar 80 (which sticks out of back of hand truck) with edge of an upper step at 80a, while notch 86 is connected to brake member chain 75, will cause the descending hand truck 10 to land in a braked position. This is, due to the fact that the back end 80b of the stabilizer can't move down together with the hand truck, since the edge of the stair at 80a, interferes with downward movement. The stabilizer turns on pivot point 82, which results in the front end of stabilizer 86 moving downward, thereby automatically pulling down the chain 75, while it is connected to the upper connection point, (the chain can be pulled so low because of the spring 76 in its center). This maneuver results in the same brake position, such as when the chain is connected to the lower connection point, which is a full braked position. Once the hand truck lands on each of the lower stairs (while descending), the stabilizer is released from the edge of the upper stair, by pushing the hand truck forward towards a standing position. Then the spring 76 pulls the chain 75 back up and releases the wheel from the brake. This enables additional safe landing on the remaining stairs.

While the above braking system has been described specifically with respect to the hand truck embodiment. Similar structures, adapted to the wheels and configuration of specific wheeled devices, may be incorporated in any wheeled device or conveyance to provide an automatic braking action, when desired.

Figure 10:
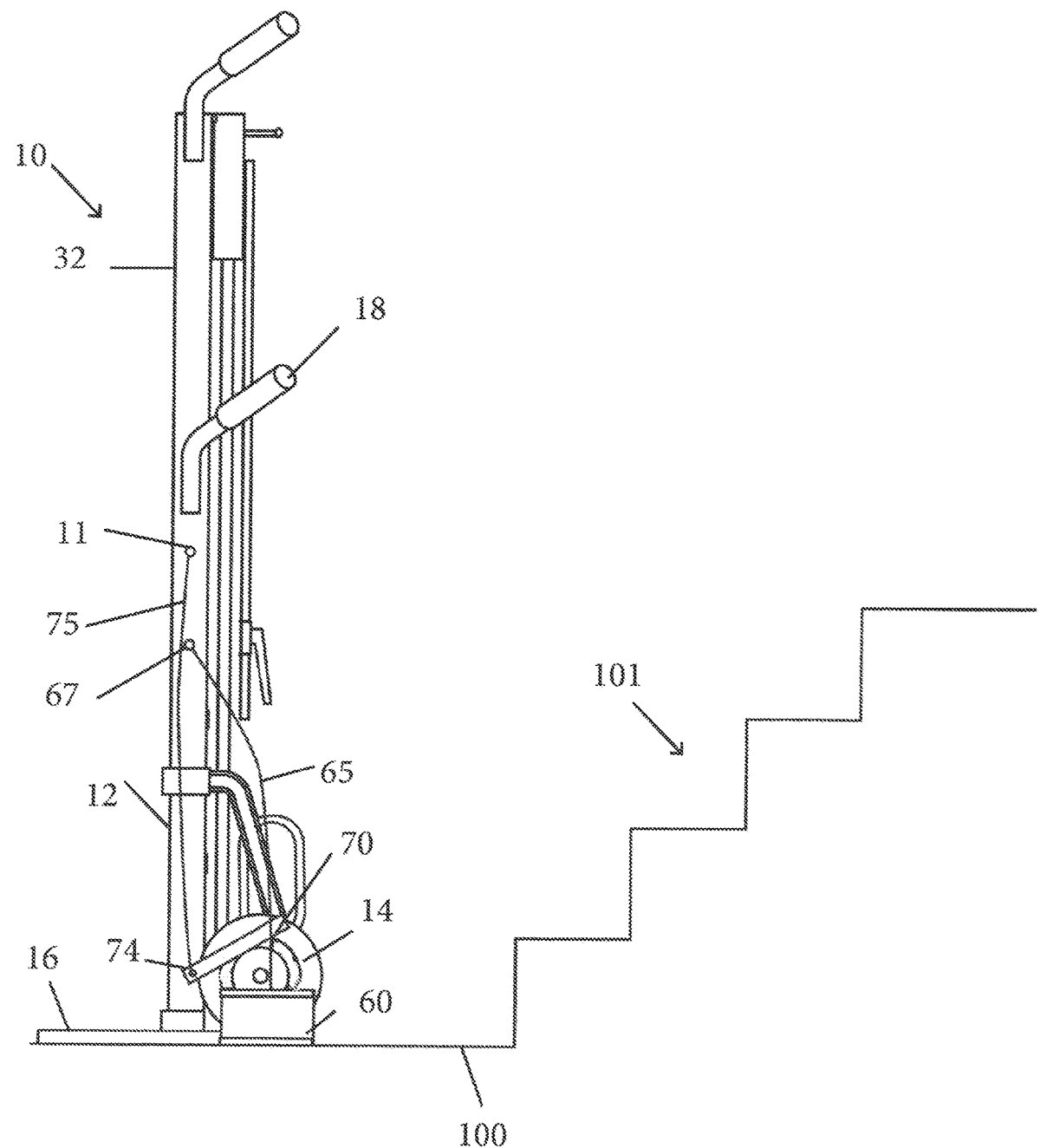
FIGS. 10-15 and 17 are side elevation views illustrating the operational method of lever positioning and sequential movement up a staircase of an exemplary hand truck in accordance with an embodiment of the invention.
Figure 11:
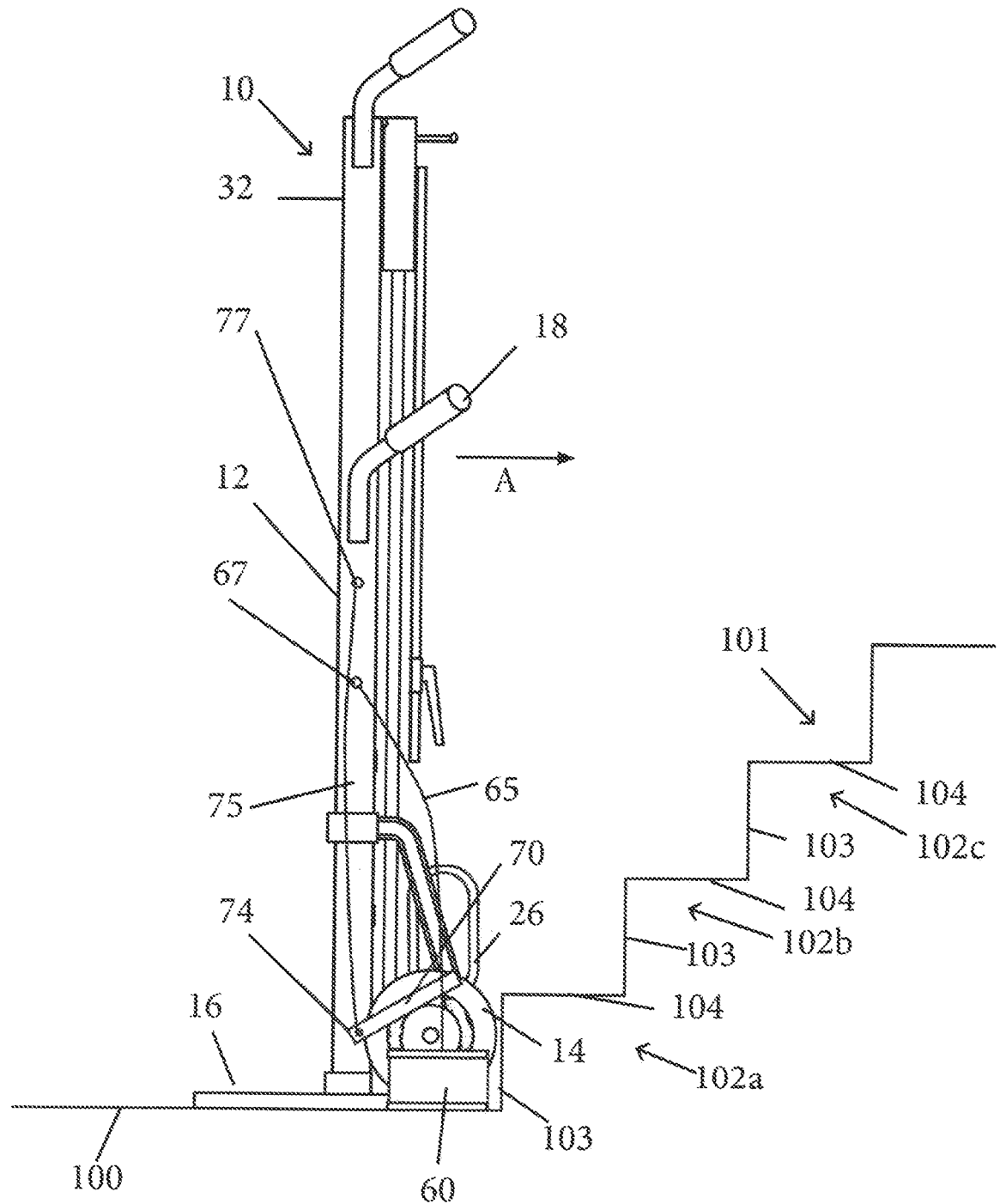

Having generally described the components of the exemplary hand truck 10, operation thereof will be described with reference to FIGS. 9-16. Referring to FIGS. 10 and 11, the hand truck 10 is configured for normal, non-climbing operation, in that each cord 65 is connected to the upper connection point 67 such that the shoes 60 are in the non-engaging arrangement and each chain 75 is connected to the upper connection point 77 such that the brake members 70 are in the disengaged position. The hand truck may be wheeled (or otherwise moved) relative to the surface 100 via the wheels 14 and by tilting of the frame 12 via the handles 18. As illustrated in FIG. 11, the hand truck 10 may be moved in the direction of arrow A such that it is positioned near the base of a set of stairs 101 with the belt 26 positioned adjacent the first step 102a. Each step 102a, b, c . . . includes a riser 103 and a tread 104, with the hand truck 10 so positioned, the lever assembly 30 and the shoe assemblies 50 may be utilized to help move the hand truck 10 up the set of stairs 101, i.e. climbing.

Figure 12:
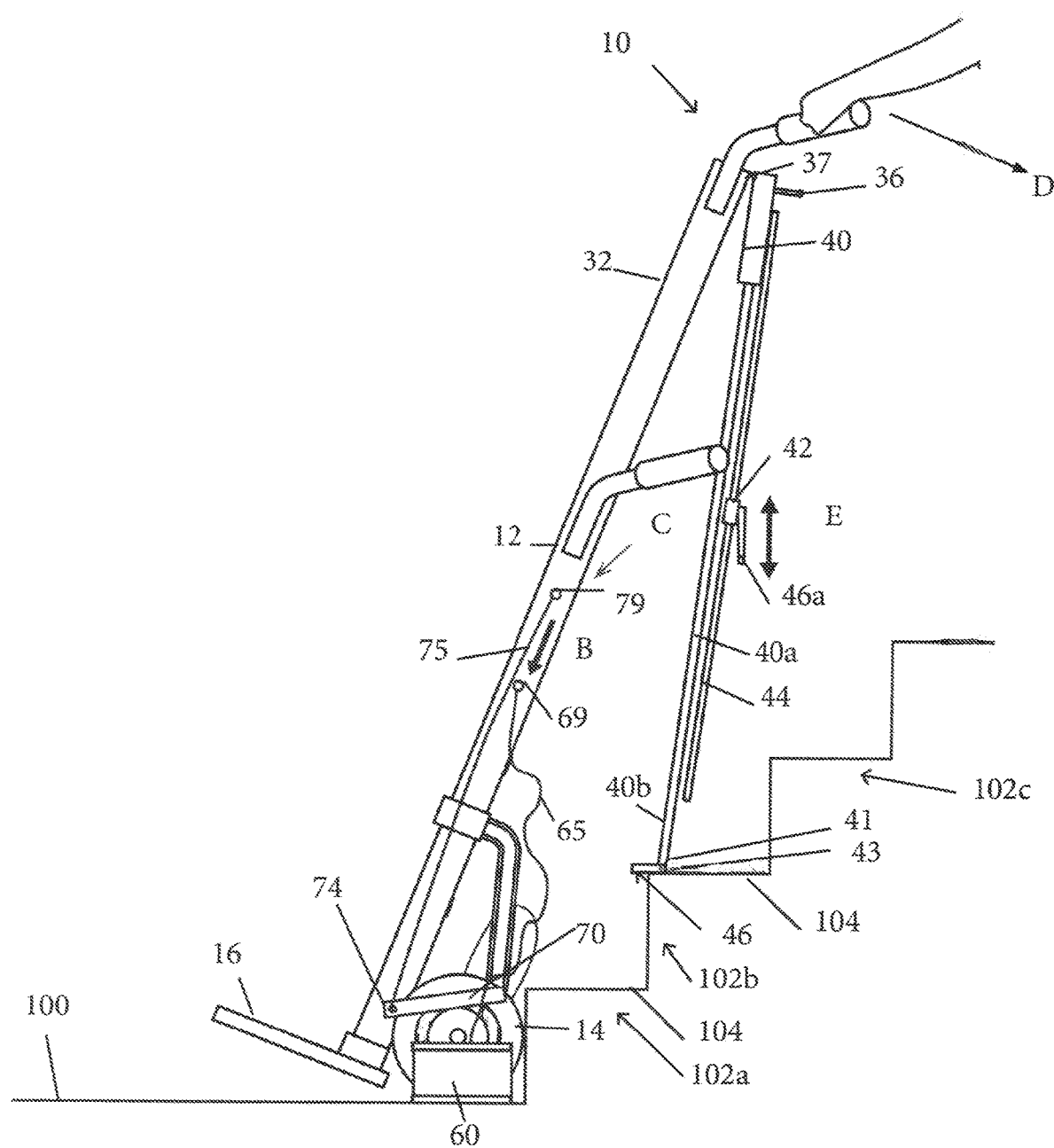

Turning to FIG. 12, to ready the hand truck 10 for climbing, the shoe assemblies 50 and the brake members 70 are adjusted by moving the cords 65 and the chains 75. That is each cord 65 is moved to the lower connection point 69 as indicated by arrow B such that the shoes 60 are in the engageable arrangement and each chain 75 is moved to the lower connection point 79 as indicated by arrow C such that the brake members 70 are in the engaged position. The hand truck is now in an angular position relative to the operator (The lever member should be positioned in the same direction as the hand truck). The sequential ascent is thereafter remarkably aided by the skilled operator's choice of leverage positioning of the lever member, Therefore, as shown in FIG. 12, in one embodiment, the lever handle 36 is used to pivot the lever member 40 about hinge 37 such that the free end 41 is positioned proximate the tread 104 of the second step 102b. The first step 102a is left clear such that the wheels 14 will be moved to that tread 104 during an initial part of the lifting sequence. It is also possible that the free end 41 may be positioned proximate to the tread of the third step 102c. In this embodiment, the target positioning choice is on the front half of the step close to the edge. Once positioned proximate, and the tubes 40a and 40b are adjusted to one another, as indicated by arrow E, until the free end 41 is sitting on the tread 104. The handle 46a is re-engaged with the toothed bar 44 such that the length of the lever member 40 is fixed. It is noted that at this stage, the boot 46 is pivoted about pivot pin 43 such that the boot 46 lies flat along the tread 104, preferably facing toward the hand truck 10. Persons skilled in the art will appreciate that lever member 40, toothed bar 44, and boot 46 may be adjusted and positioned based on stair height, stair depth, and weight of the load to be carried to obtain the desired leverage and lift which may vary in terms of preference from operator to operator and load to load. The length of the lever member 40 with boot 46 may, in some embodiments, be dimensioned to compensate for missing stairs or for use with stairs of varying height dimensions. The rigid extension effected by the pivotal movement of boot 46 and surface pressure locking can be deployed or released without removal of manual engagement of the handles.

Figure 13:
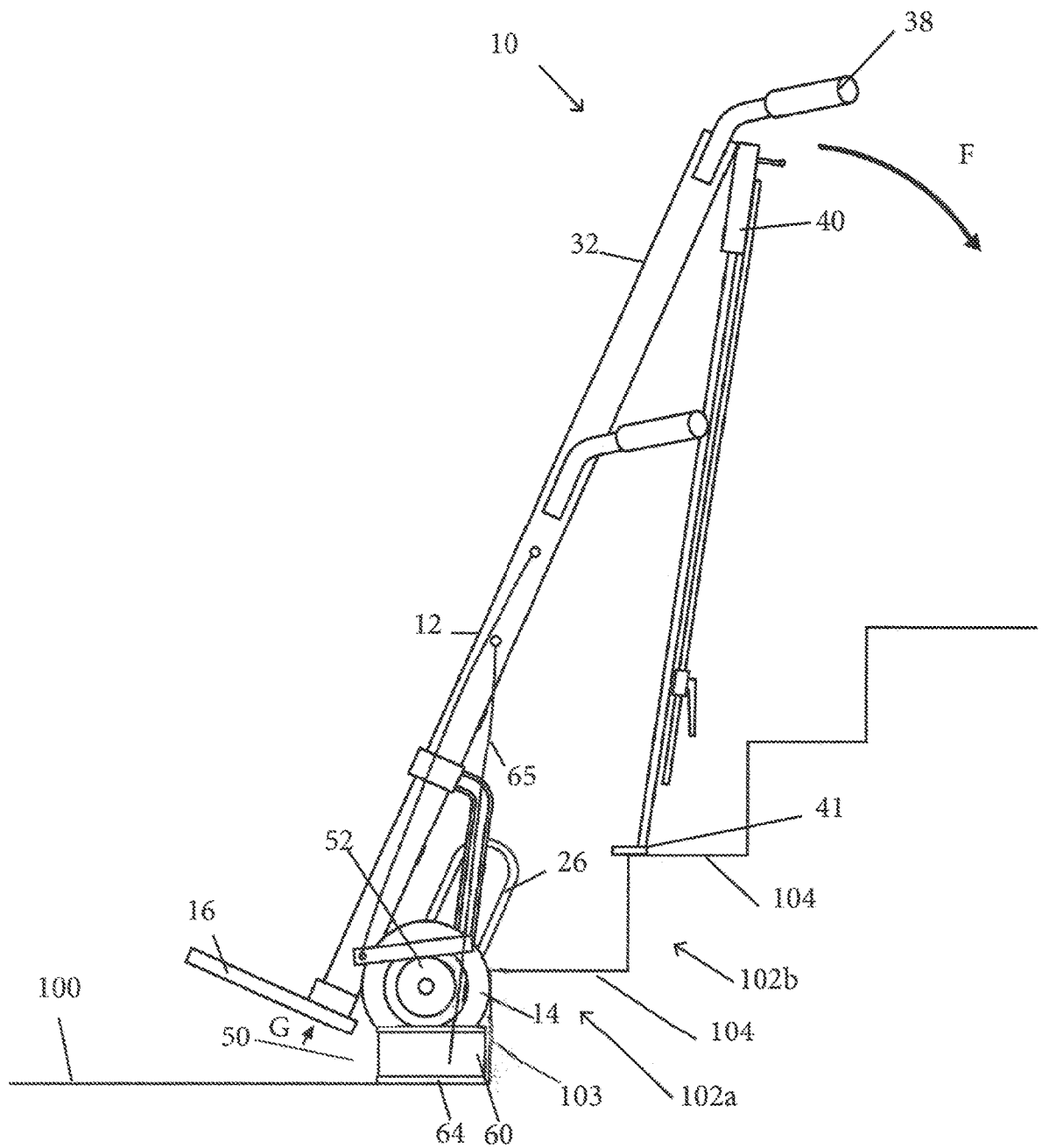

Referring under the above choice of position to FIG. 13, with the lever member 40 so positioned, a pivoting force is applied to the pivot handles 38, as indicated by arrow F. With the free end 41 of the lever member 40 engaged with the tread 104 and the belt 26 and wheel 14 against the riser 103 of the first step 102a, the pivoting force causes the hand truck 10 to move upward as indicated by arrow G. As the hand truck 10 moves upward, the shoes 60 are free to pivot about the respective hinges 56 until the contact surfaces 64 are positioned on the surface 100 and the hand truck 10 maintained elevated, as shown in FIGS. 9 and 13, by the support frame 63 and support block 52.

Figure 14:
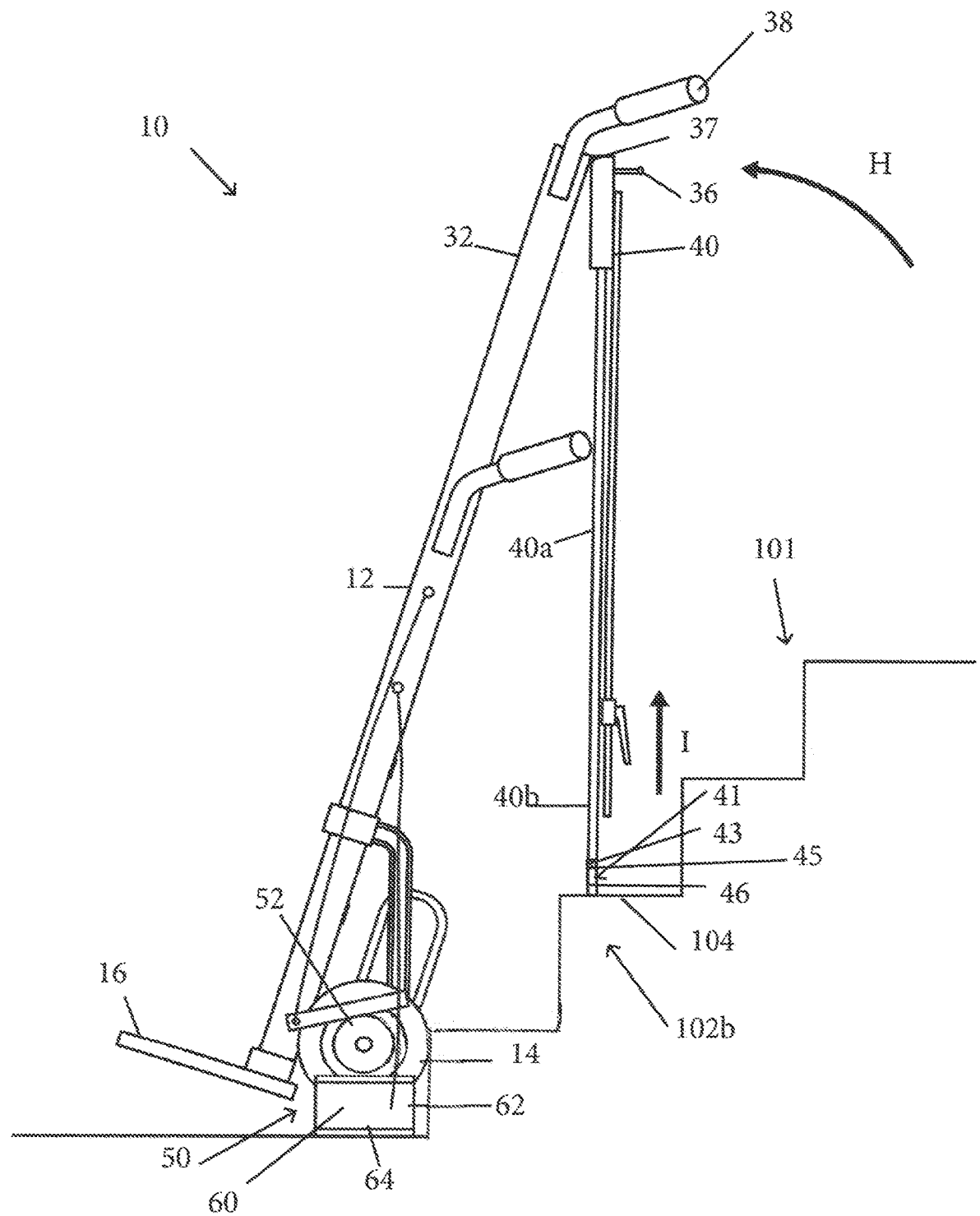

Turning again under the above choice of position to FIG. 14, the hand truck 10 is pivoted via pivot handles 38 in the direction indicated by arrow H. As the hand truck 10 is pivoted, the shoe assembly 50 maintains contact and allows pivoting based on the pivotal connection of the support block 52 relative to the frame 12. As the hand truck 10 is pivoted forward, as indicated by arrow H, the lever member 40 is automatically lifted, as indicated by arrow I, and the boot 46 pivots relative to the free end 41 until the contact surface 48 is resting on the tread 104. Handle 36 can be used to control and direct lever and boot positioning. As more clearly depicted in FIGS. 19A-E, the free end 41 of the lever member 40 engages with the pin 45 of the boot 46 which becomes completely stationary and rigid as if it would be an integral part of the lever, as long as pressure continues to be applied through the boot and onto the tread surface (release of such pressure enables the boot 46 to be pivoted back). The pivot force therefore travels through the lever member 40 and boot 46 to the contact surface 48, which is engaged with the tread 104 with pressure of the engagement holding it in place against retaining pin 45. The boot 46 preferably has a height approximately equal to the height of the shoe 60 such that the lever member 40 and boot 46 together define a lever arm which is similar to the original lever arm without boot 46 and shoes.

Figure 15:
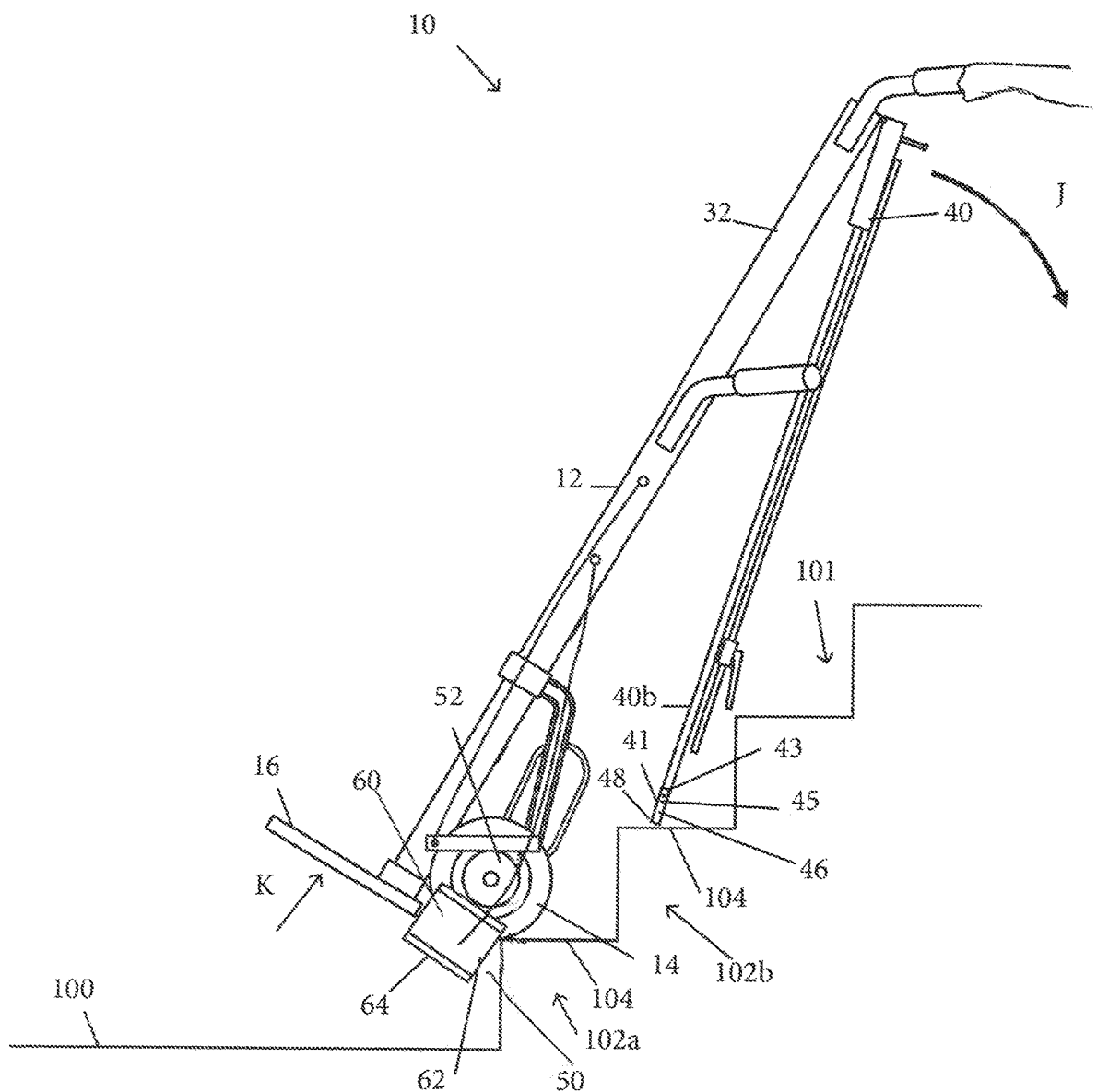
Figure 16:
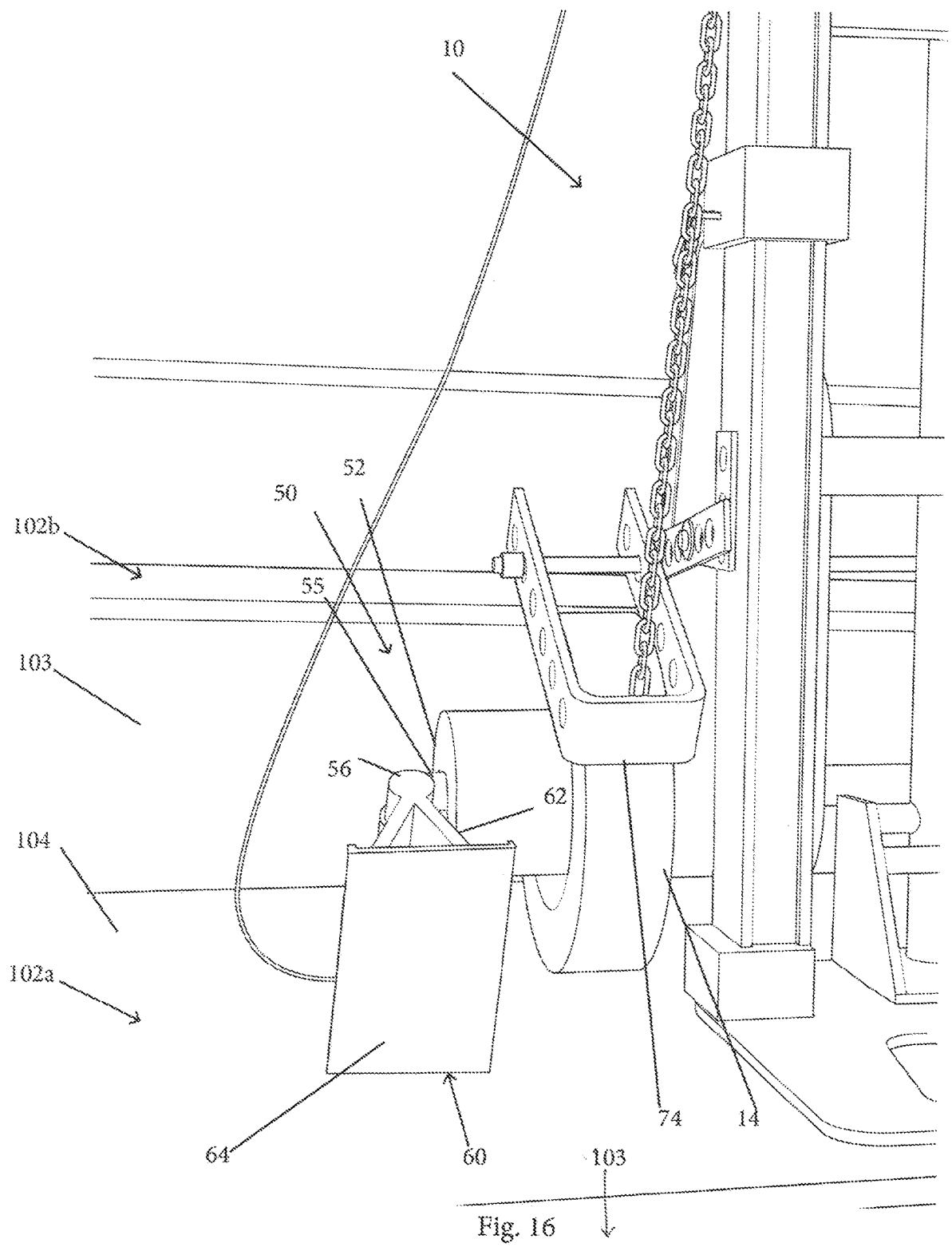
FIG. 16 is a front perspective view of the brake and shoe assembly as the wheels of the hand truck assembly are moved onto a tread of the staircase.
Figure 17:
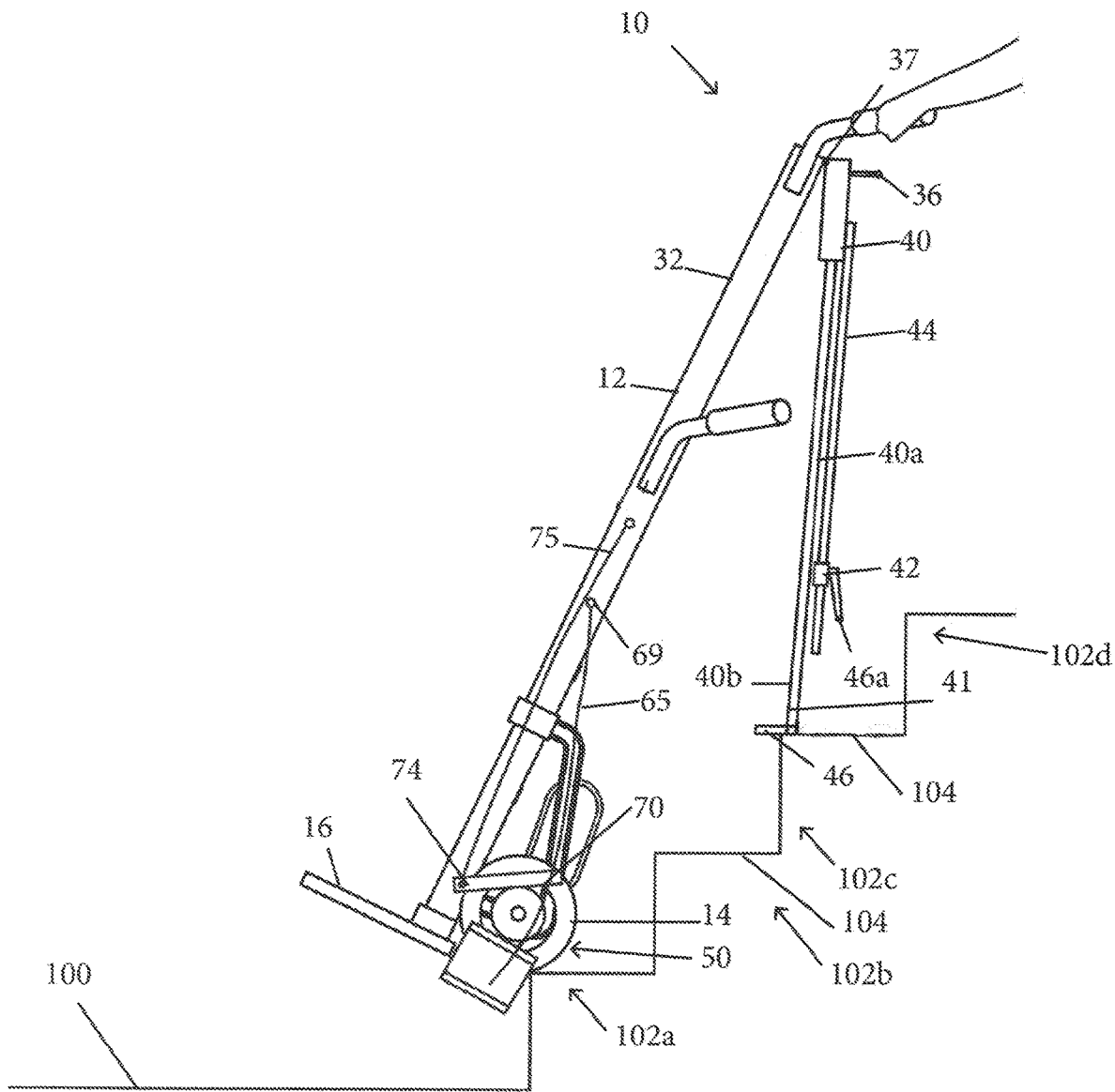

Referring further to FIG. 15, to complete the move of the hand truck 10 onto the tread 104 of the first step 102a, a pivoting force is again applied to the pivot handles 38, as indicated by arrow J. As such, the pivoting force causes the hand truck 10 to move upward as indicated by arrow K. As the hand truck moves upward, the wheels 14 clear the riser 103 of the first step 102a and the wheels 14 are free to move onto the tread 104 of the second step 102b. With the pivotal nature of the support block 52, the shoe assemblies 50 simply pivot as shown in FIGS. 15 and 16 as the hand truck 10 moves onto the tread 104 of the first step 102a. With reference to FIG. 17, once the hand truck 10 is completely on the tread 104 of the first step 102a, the process can be repeated for moving upward to other steps.

While placement of free end 41 of lever member 40 on second step 102b is preferred, in certain embodiments, placement of free end 41 may be varied based on desired leverage, space constraints, and other operational considerations that will be appreciated by persons skilled in the art. It is to be noted that under any positioning strategy the operator's choice of lever positioning may vary from step to step and particularly when the load is to be moved from a step to a landing. At such point the operator may lengthen the lever to facilitate adjusting the positioning strategy as shown in FIG. 18. In FIG. 18 the cord 65 of the shoe includes a spring 66 in its center. This spring (or similar member) is useful when lifting the hand truck on to a space limited landing. Because it is space limited, the hand truck must be stood up in a standing position which causes a loss of space for open shoes between bottom surface & a wide load, the spring 66 causes the shoe to close automatically when lifting the shoe from the step below the landing. When the hand truck is positioned with open shoe as shown in FIG. 18, cord 65 is attached to a higher connection point that stretches the spring 66, this causes the automatic shoe closure, once it is released of load pressure (by lifting the hand truck). When the hand truck is in position for lifting on to a small lending, the lever is stretched much more than usual to replace the height of 2 & ½ missing steps. In this case the lever is not positioned slanted as usual but rather slightly at an opposite slant. This position is needed to solve the problem of missing space—needed to bend the hand truck into an inclined position. Certain operators at this landing point may in all events also find useful the availability of the second set of handlebars at a lower height which second set also eases traditional operation of the hand truck in surface movement of a load at ground level or other flat surface.

With reference to FIG. 21, the hand truck is, alternatively to the previously described stabilizing shoe structure 50, hingedly provided with a stabilizing triangular shaped element 150 positioned on and across the rear of the hand truck and just above and adjacent to the wheels as a stabilizing element to prevent the hand truck from backing down during lever extension, as described above with the shoe embodiment. Triangle element 150 is spring loaded with spring 151 and prevented from inversion by chain 152 (more clearly seen in FIG. 21A).

Figure 21A:
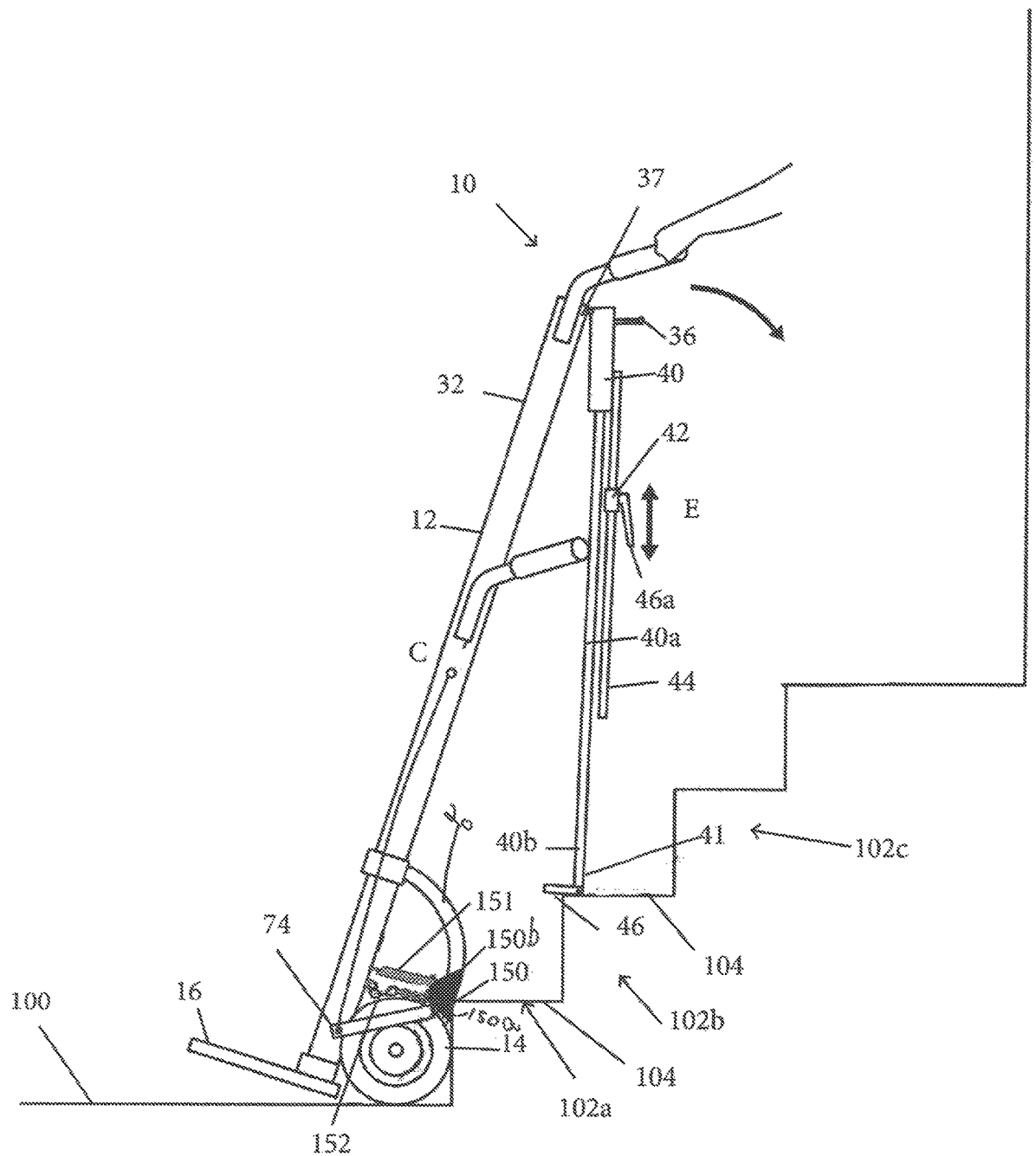
Figure 21B:
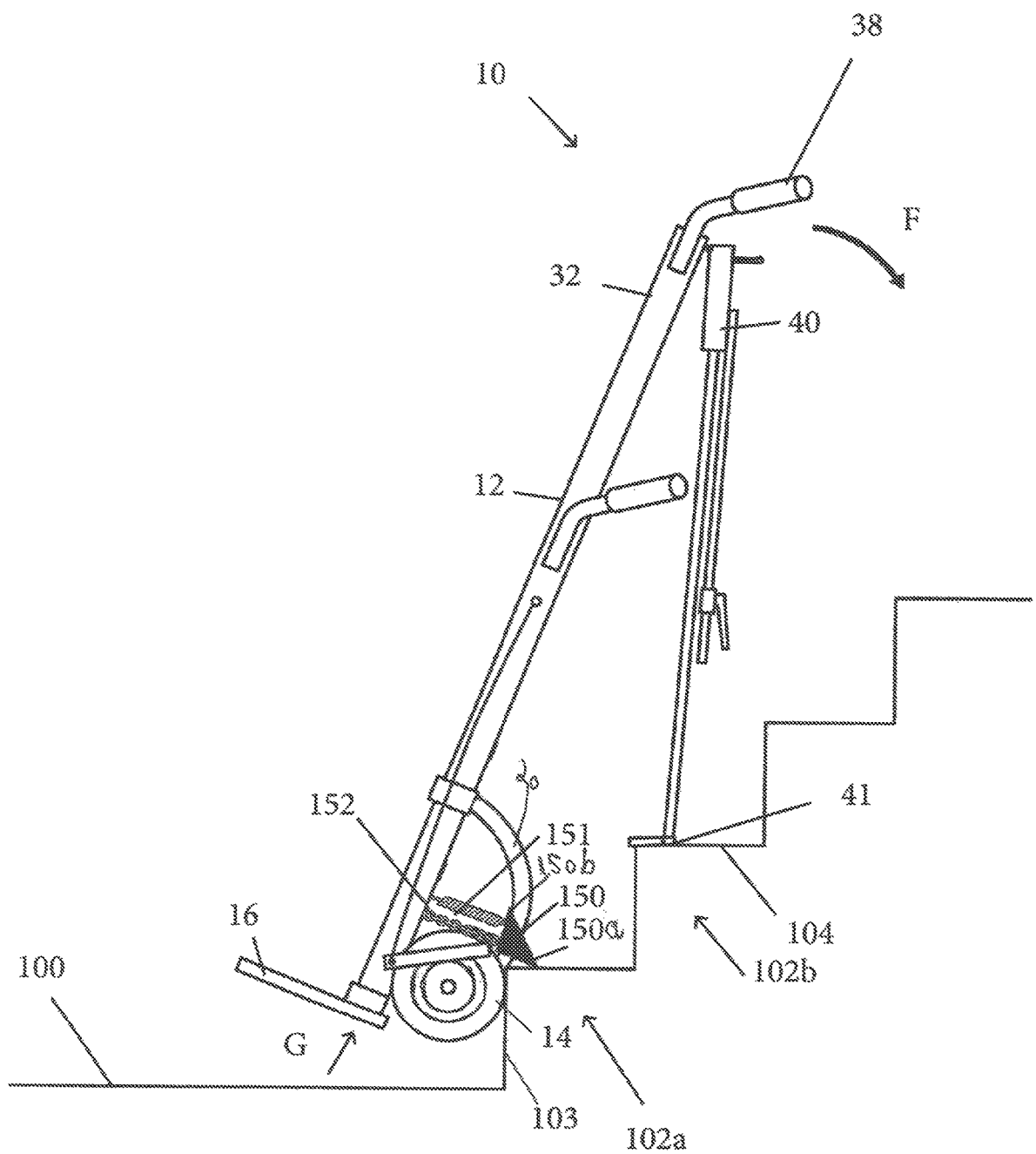
Figure 21C:
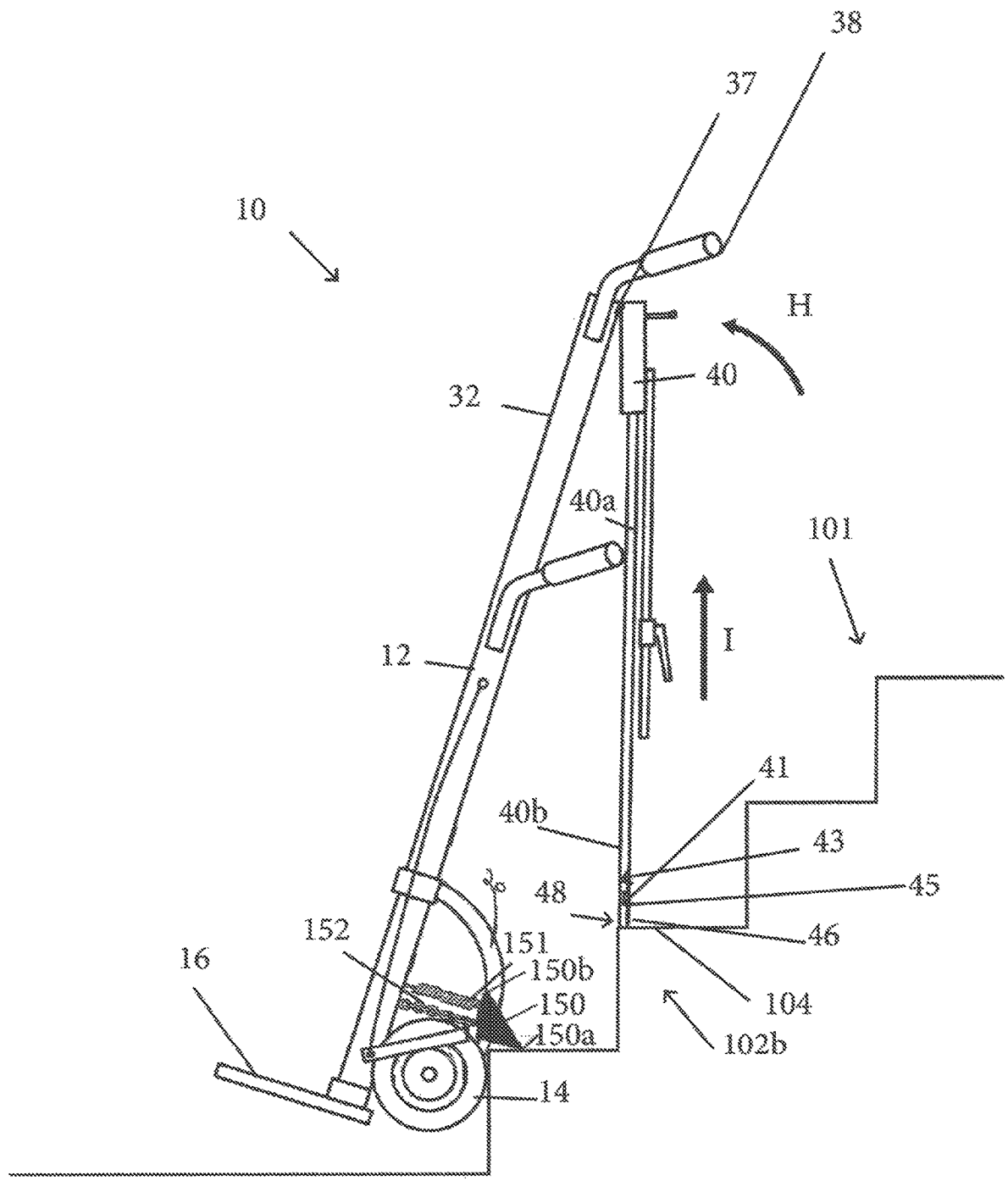
Figure 21D:
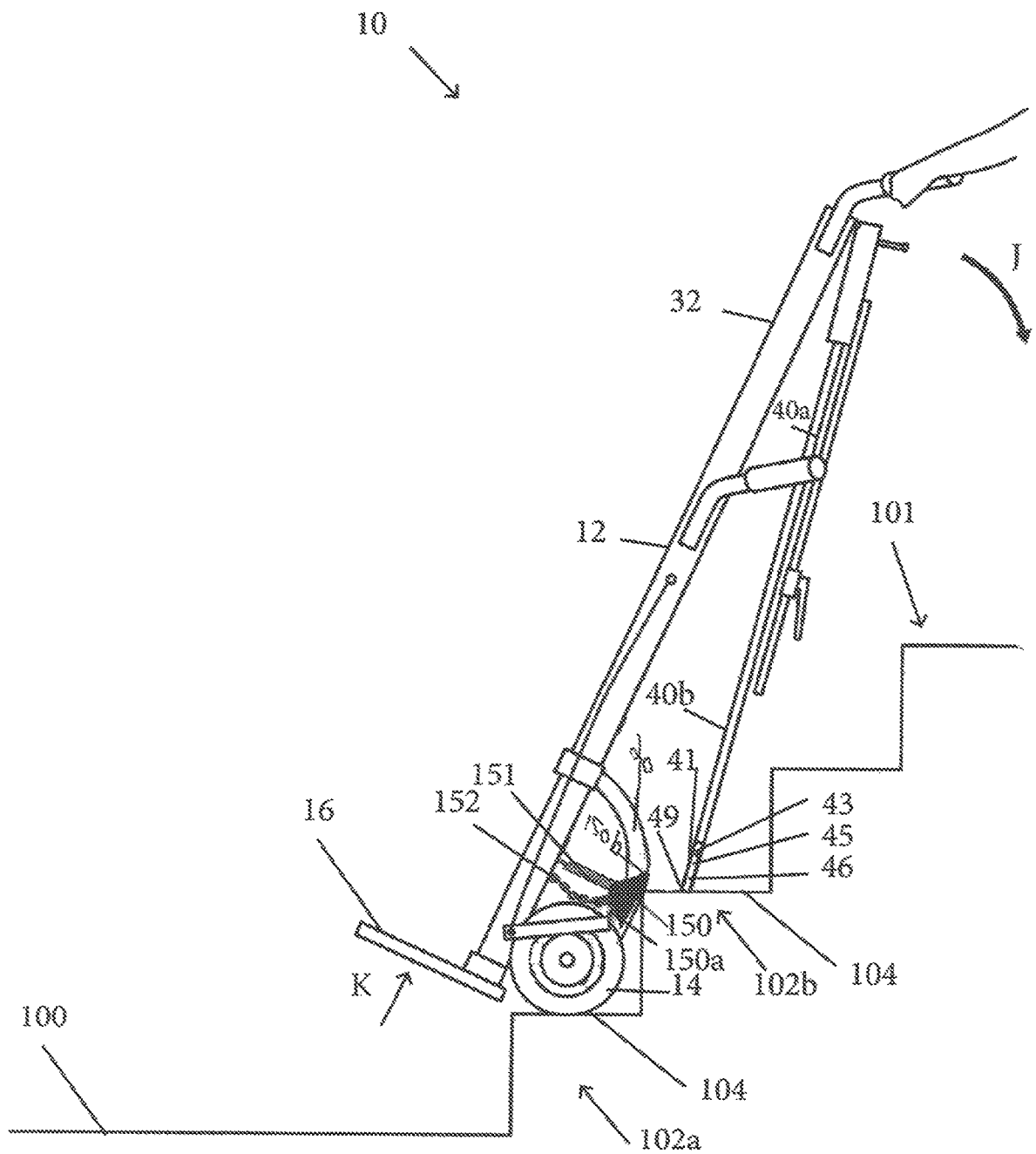
Figure 21E:
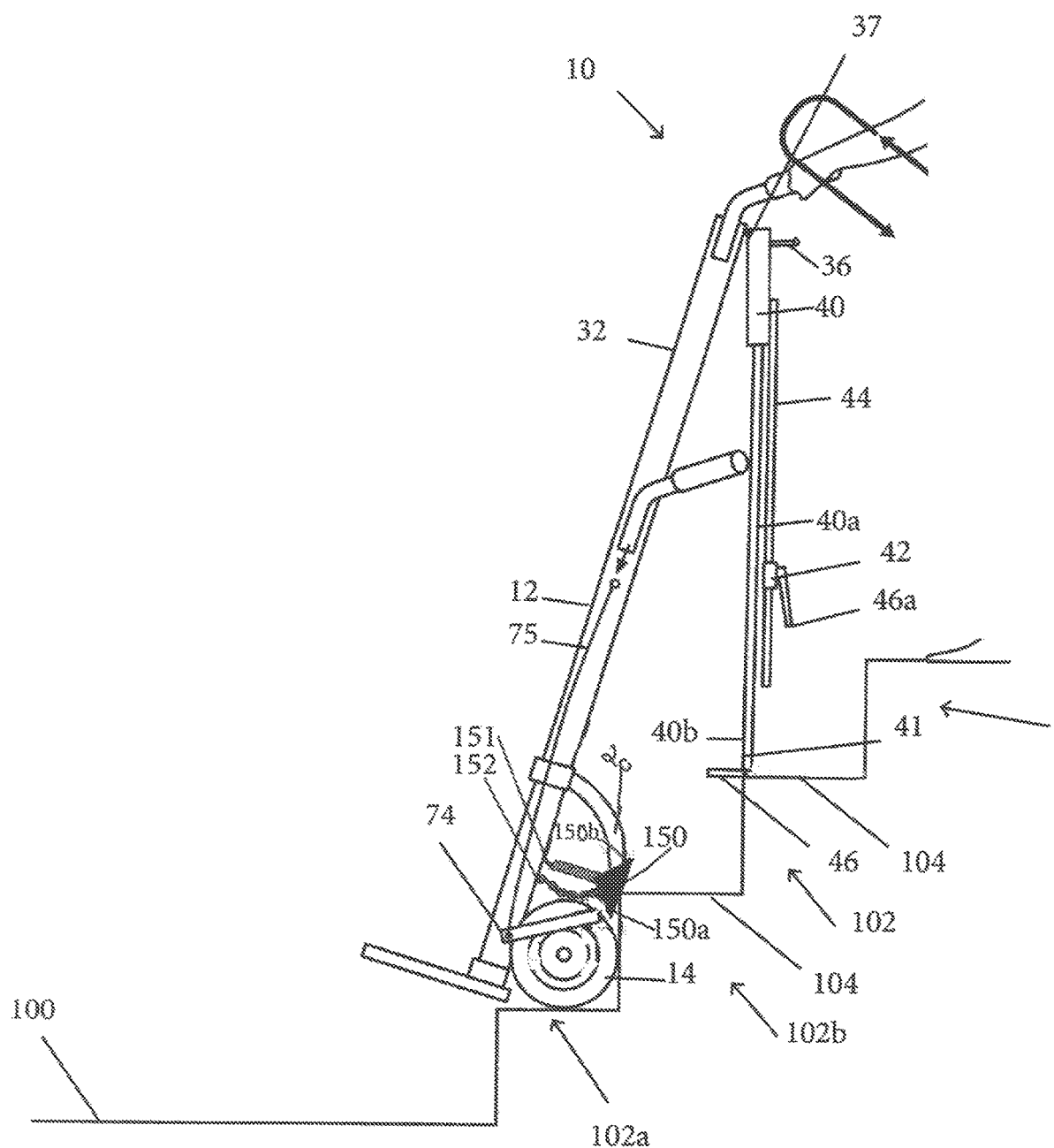

FIGS. 21A-E sequentially depict lifting operation of the hand truck 10 with the triangle element 150 pivotally connected to brackets 20 at 150b providing the position stabilizing during lengthening of lever member 40. As shown in FIG. 21A, triangle element 150 is buttressed against the stair edge 102a with spring compression and does not interfere with upward movement of the hand truck to level step 104. With leverage exerted via lever member 40, as the lower edge 150a passes the edge 102a of the stair, compressed spring 151 pushes the triangle element 150 and rotates it to the step 104 engaging position, shown in FIG. 21B. This retards or prevents downward or backward movement of the hand truck 10 and load during release of the lever member 40 (with movement H) shown in FIG. 21C for lengthening with section 46. As the hand truck is raised to step 104 as shown in FIG. 21D step edge 102b pushes triangular section 150 back into a retracted position which does not interfere with subsequent further upward movement. As with the prior embodiment lengthened lever member is used to further raise the hand truck with leverage to a higher or second stair level with the lever member 40 being released from pressure and the lengthening section 46 is returned to its original position as shown in FIG. 21E.

The operations of levered lifting, position stabilizing, lengthening of lever member with second levered lifting are continued until the hand truck clears the steps. Braking procedure and elements, as with the prior embodiment, effects prevention of backward slipping and control with descending of stairs with a load and is configured to be retracted when the hand truck is a descending operation.

Embodiment with Multiple Lever Elements

FIGS. 22A-F show a second embodiment of a typical hand truck 110 which is provided with a levering lifting mechanism with a handle raised extensible extension 138a above standard height handle 138b, to facilitate operation, and a three lever mechanism 140 hingedly attached at 137 to an upper part of the hand truck frame 110a. The three lever mechanism 140, as shown has a common hinged focal point 137 and the lengths of the respective lever members (140a, 140b and 140c with heights varying and successively shorter by approximate step riser heights) are adjustably configured with handles 146a, 146b, 146c respectively, to respectively engage succeeding steps 114, 116, and 117, as shown in the respective drawing sequence.

As shown in the FIG. 22A-F sequence, respective levering with the lever members lifts the hand truck from surface 113 and supported load sequentially up the height 114a of a stair step 114 to step clearance. When the hand truck 110 and load clear the step, the hinged lever members collapse together and are moved forward to repeat the procedure for each succeeding step.

Figure 22A:
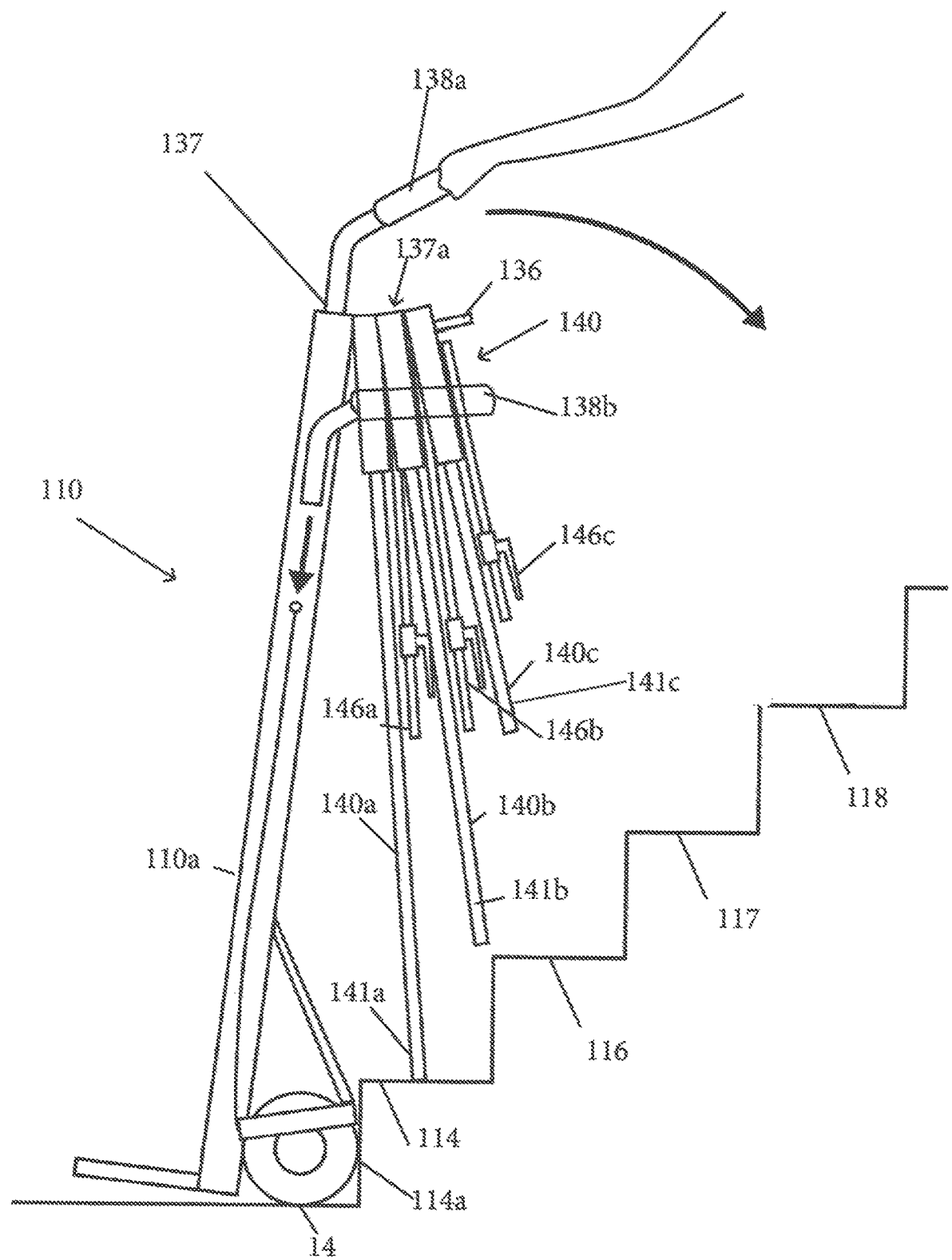
FIGS. 22A-F are a sequential depiction of the operation of a second embodiment of the hand truck of the invention, with multiple lever members, in lifting a load up stairs without an intermediate lifting support stabilizer, with illustration of the structure of three lever members.
Figure 22B:
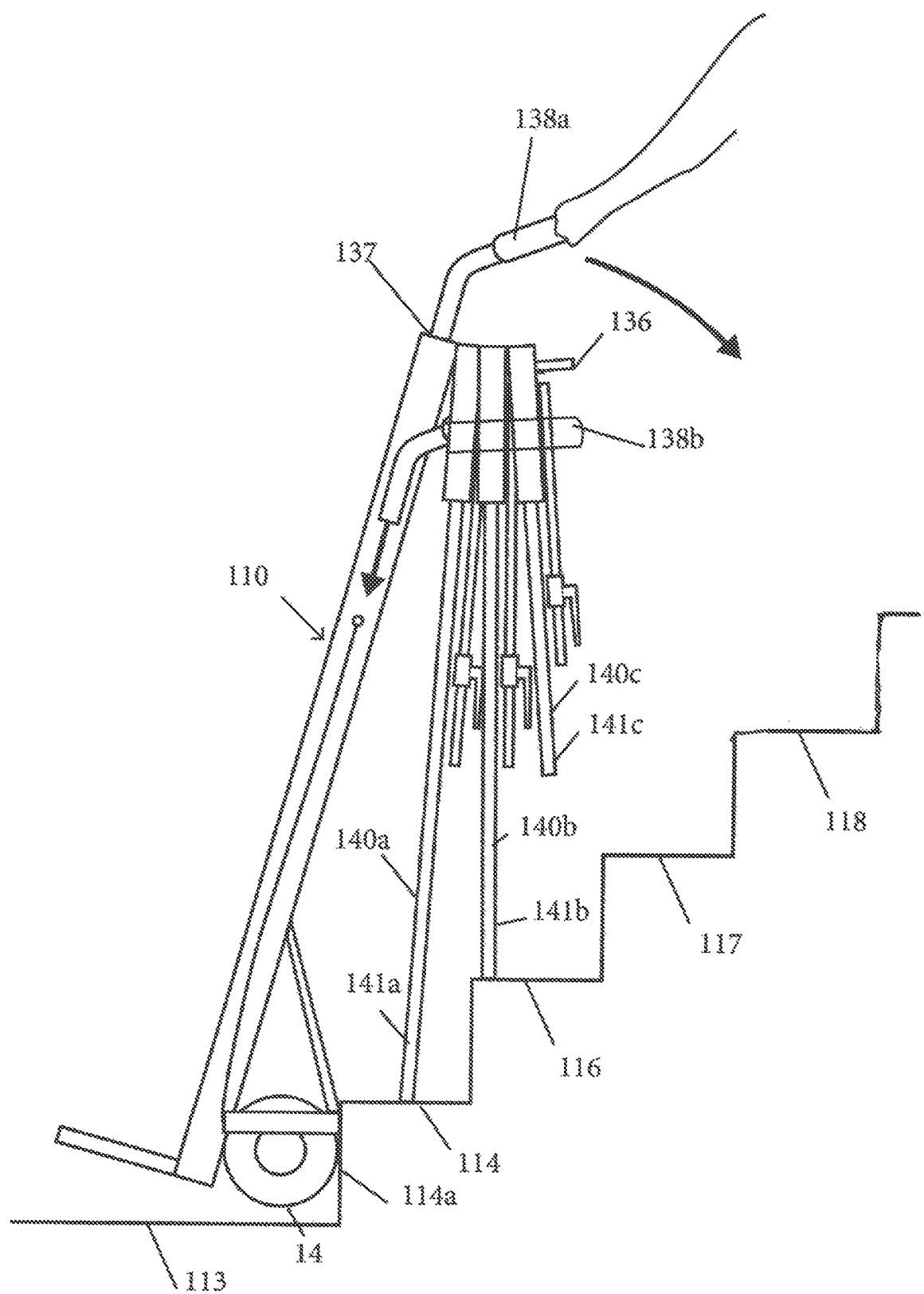

In the sequence shown in FIGS. 22A-F, which is repeated for each succeeding step. FIG. 22A shows wheel 14, brought into position adjacent step riser 114a of step 114. The end 141a of lever member 140a is brought into position for direct engagement with flat surface of step 114 by rear movement of the hand truck 110 by pulling handle 138a in the direction of the arrow and manipulation of handle 136. FIG. 22B shows that further rearward pulling of handle 138a causes shorter (by approximately a stair riser height) lever member 140b to engage flat surface of succeeding step 116 at lever member tip 141b. As shown, continued pulling on handle 138a causes levering of hand truck 110 on lever members 141a and 141b with upward movement of wheel 14 for a partial riser distance of adjacent riser 114a.

Figure 22C:
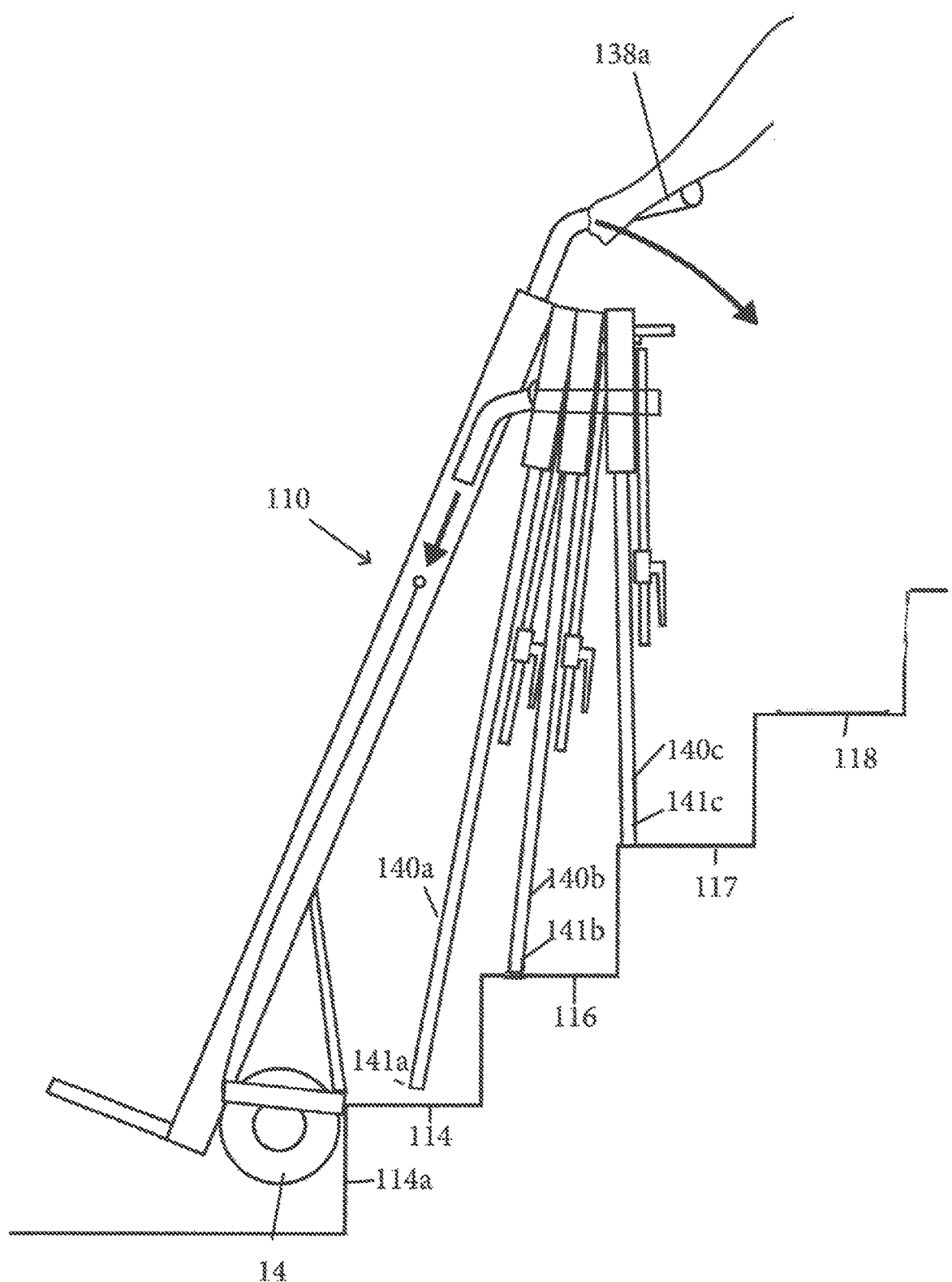
Figure 22D:
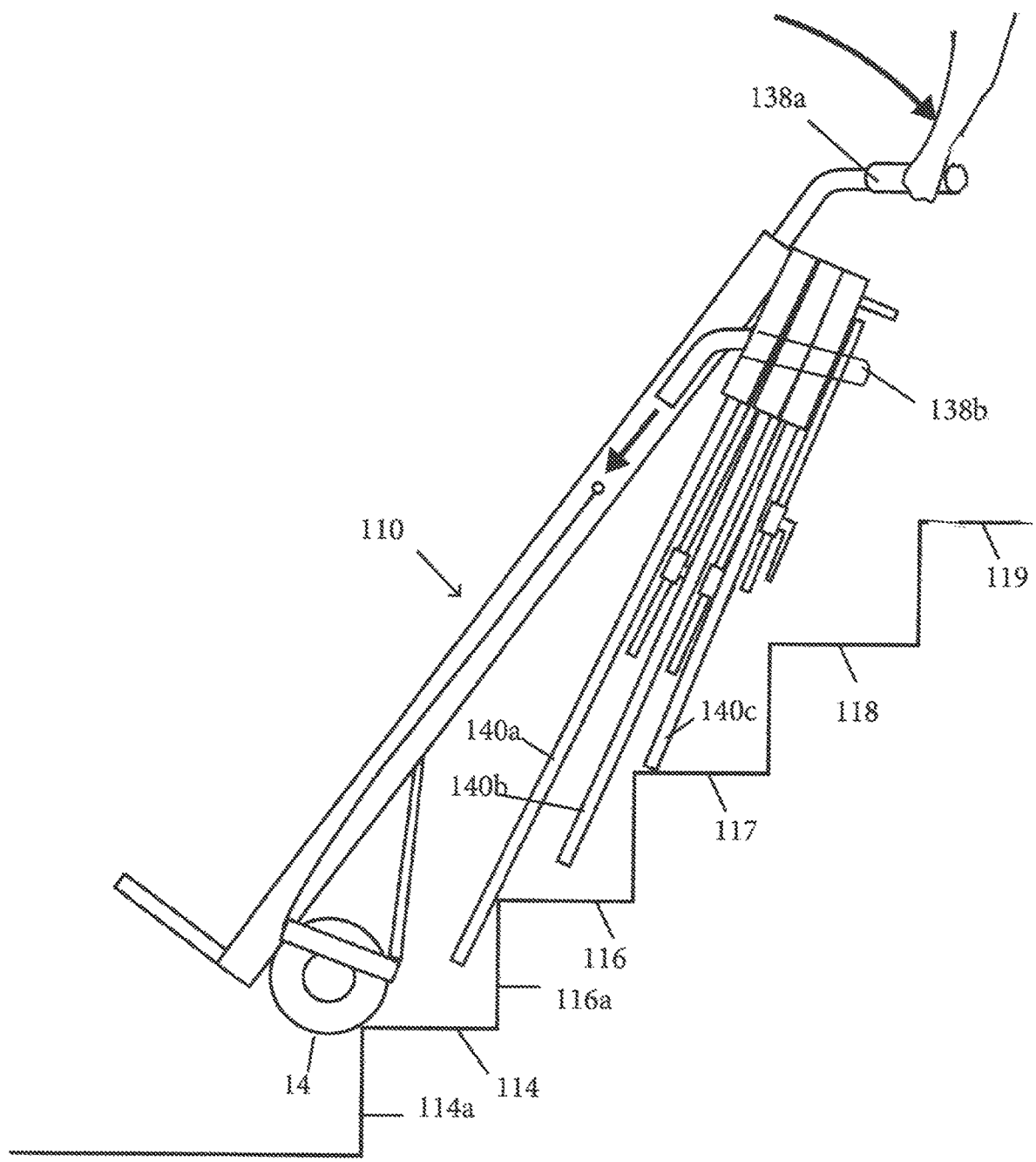
Figure 22E:
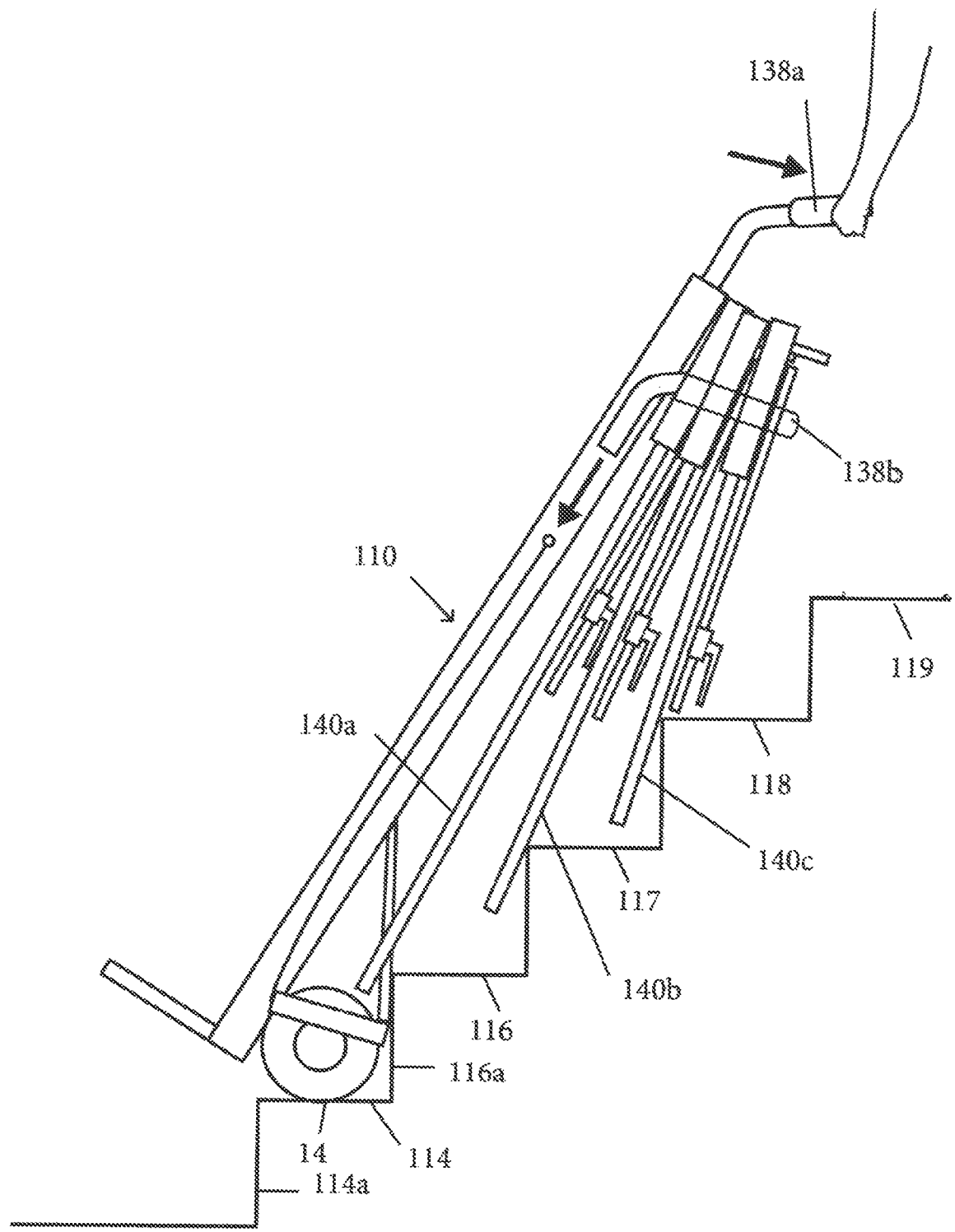

As shown in FIG. 22C, shortest lever member 140c at lever member tip 141c engages flat surface of step 117. Continued pulling of handle 138a, cause lever member 140a to be lifted flat surface of step 114 and lever member 140b and 140c serve to further provide leverage to lift wheel 14 against riser 114a. In FIGS. 22D and 22E, continued levering with lever member 140c serves to further lift wheel 14 to clear the height of riser 114a, with wheel 14 being able to roll on and rest on flat surface of step 114.

Figure 22F:
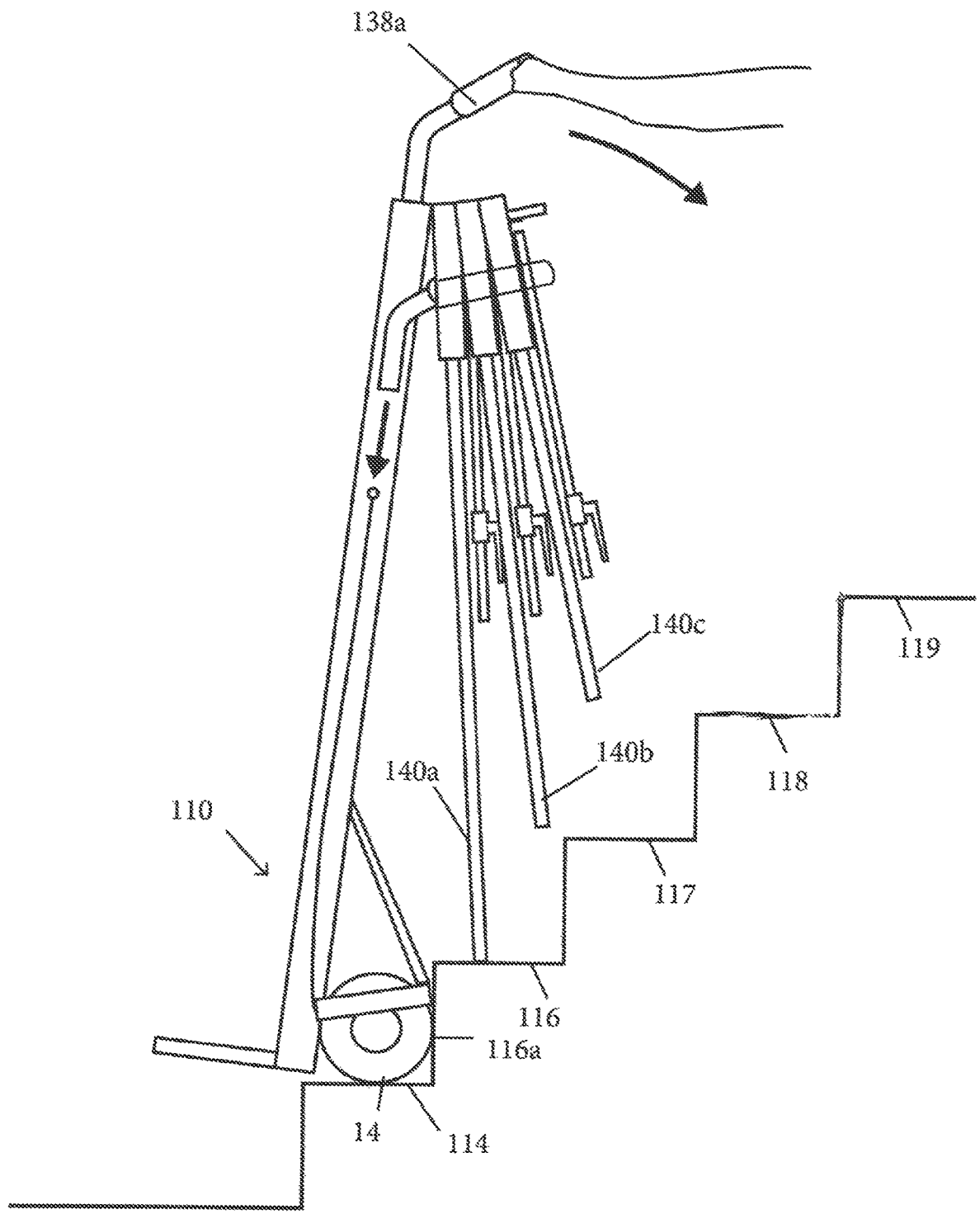

Collapse lever members 140a-c (with relief of supporting pressure) are then brought forward, as shown by the arrow in FIG. 22F. Lever member 140a is then engaged with the next succeeding flat of step 116 to bring wheel 14 up riser height 116a in a repetition of the sequence steps shown in FIGS. 22A-E. At the top of the stairs, distance spacing of varying length lever members 140-c on a landing, serves to effect the final levered lifting. In this embodiment, multiple lever members take the place of the intermediate position stabilization with a full riser height lifting with successive levering steps.

The lever members may be pre-lengthened with height adjustment prior to utilization with stair measurement or they may be height adjusted during the actual lifting procedure by means of separate handle and locking elements.

Hybrid Levering Structure Embodiment

In a third embodiment, as seen in FIGS. 23A-E, a mechanical hand truck 210 is provided with a first lever element or rod 240 hingedly attached at 237 to the hand truck frame 210a at the upper end of the frame, proximate to the handles 238. The lever element 240 is optionally provided with a length adjustment handle 246 for optional length adjustment at tip 241.

A second lever mechanism, as shown, comprises a first lifting member 340a hingedly attached by hinge 337 to the hand truck at about a third of the height of a standard hand truck frame 210. The lifting member 340 is hingedly attached at about a center of its length with a hinge element 337a and support element 350 to a levering element 340b. Chain 339 and spring member 342 between the lifting member 340a and levering element 340b and the hand truck frame 210a maintain loosely controlled positioning of the elements of the levering mechanism 240 and 340 relative to the hand truck 210, in the initial resting position of FIG. 23A. Hand truck wheel 250 rests on initial planar surface 213 adjacent to first step 214 and riser 214a. Free end 341 rests close to surface 213 adjacent riser corner 214a'.

Figure 23A:
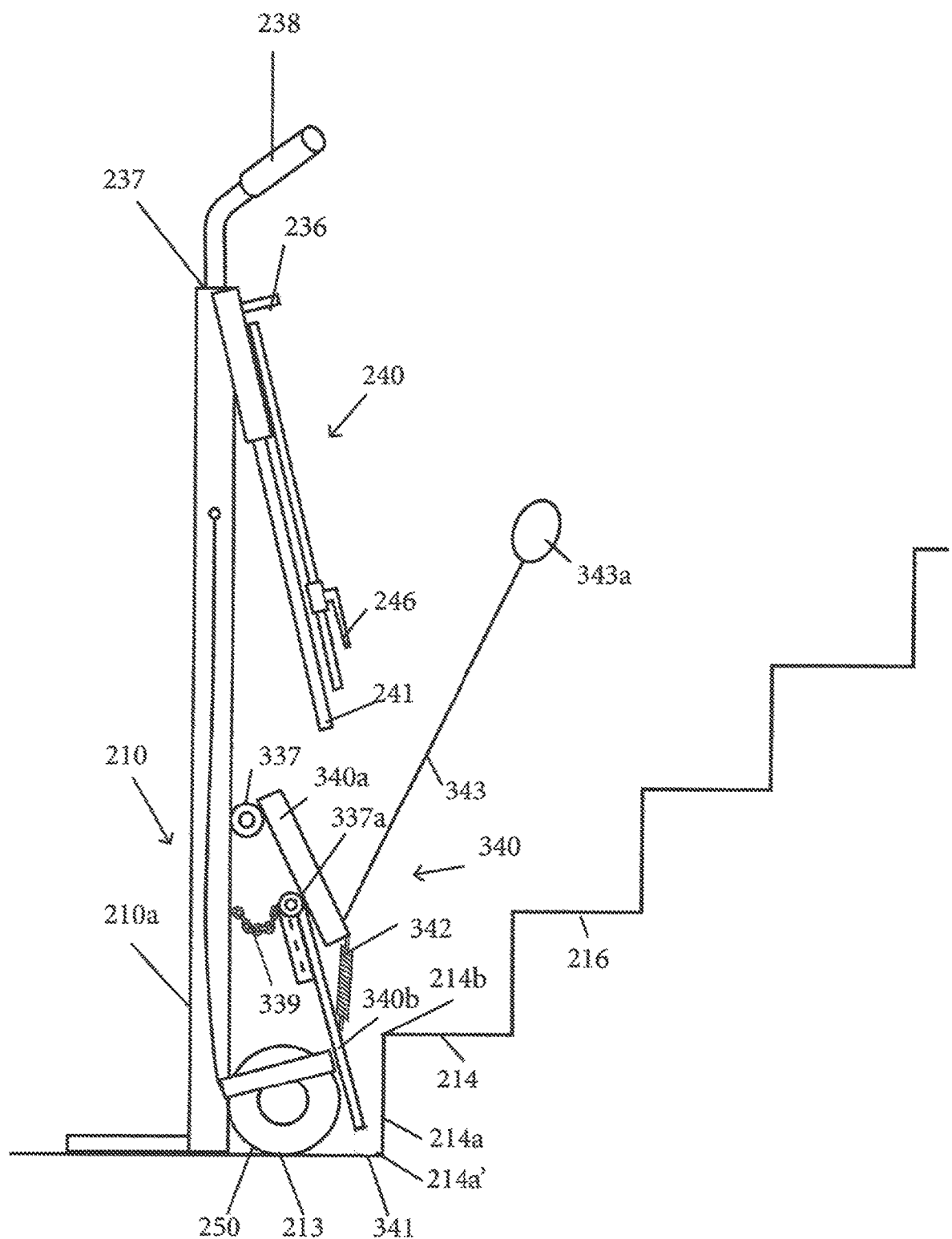
FIGS. 23A-E depict the structure and sequential operation of a third embodiment of the hand truck of the invention, from original placement with a dual lever member without an intermediate lifting support stabilizer, and (FIG. 23A); lifting of the levering element to clear a step riser (FIG. 23B); levering placement of the levering element (FIG. 23C); initial levered lifting of the hand truck (FIG. 23D) and completed levered lifting of the hand truck (FIG. 23E).
Figure 23B:
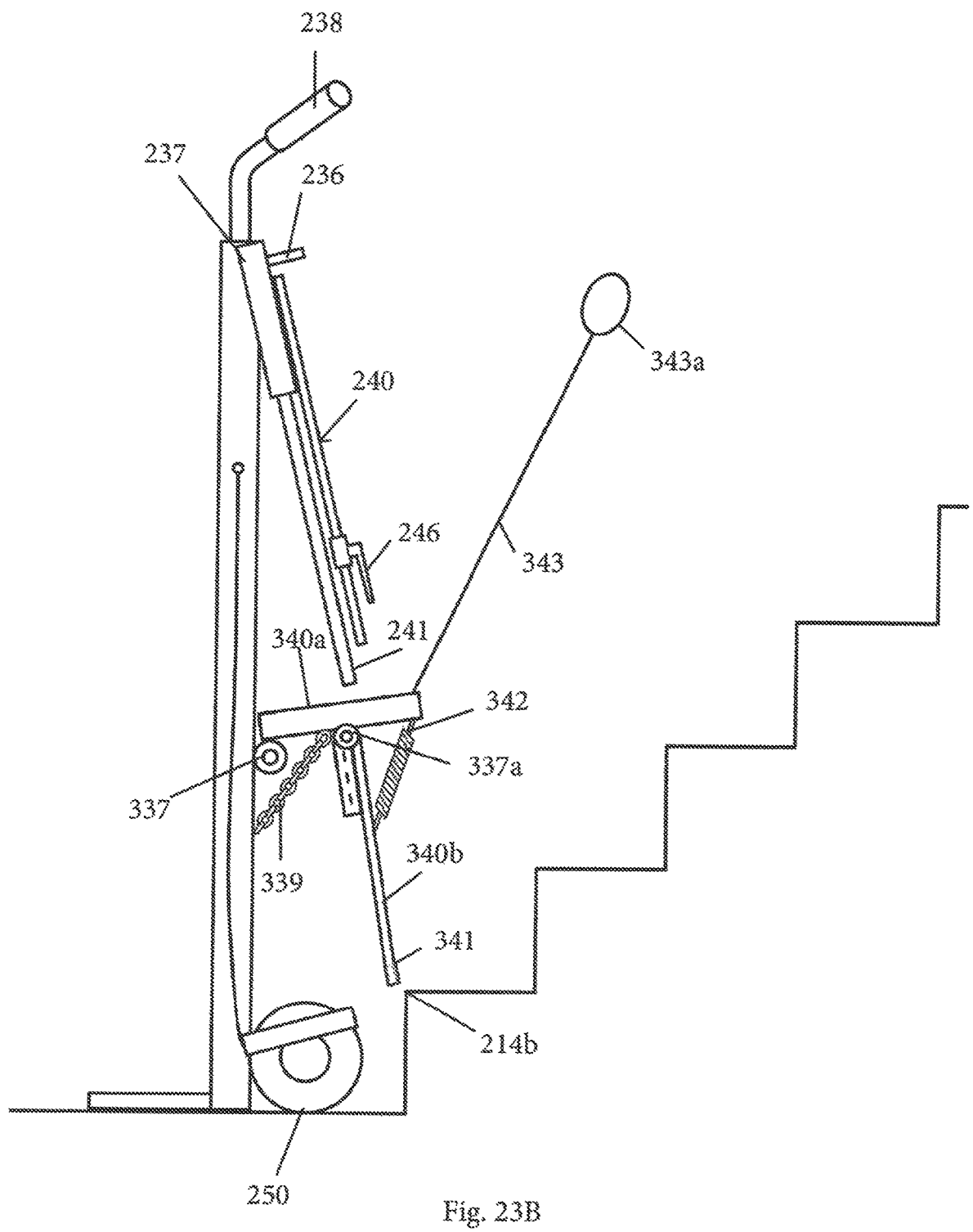
Figure 23C:
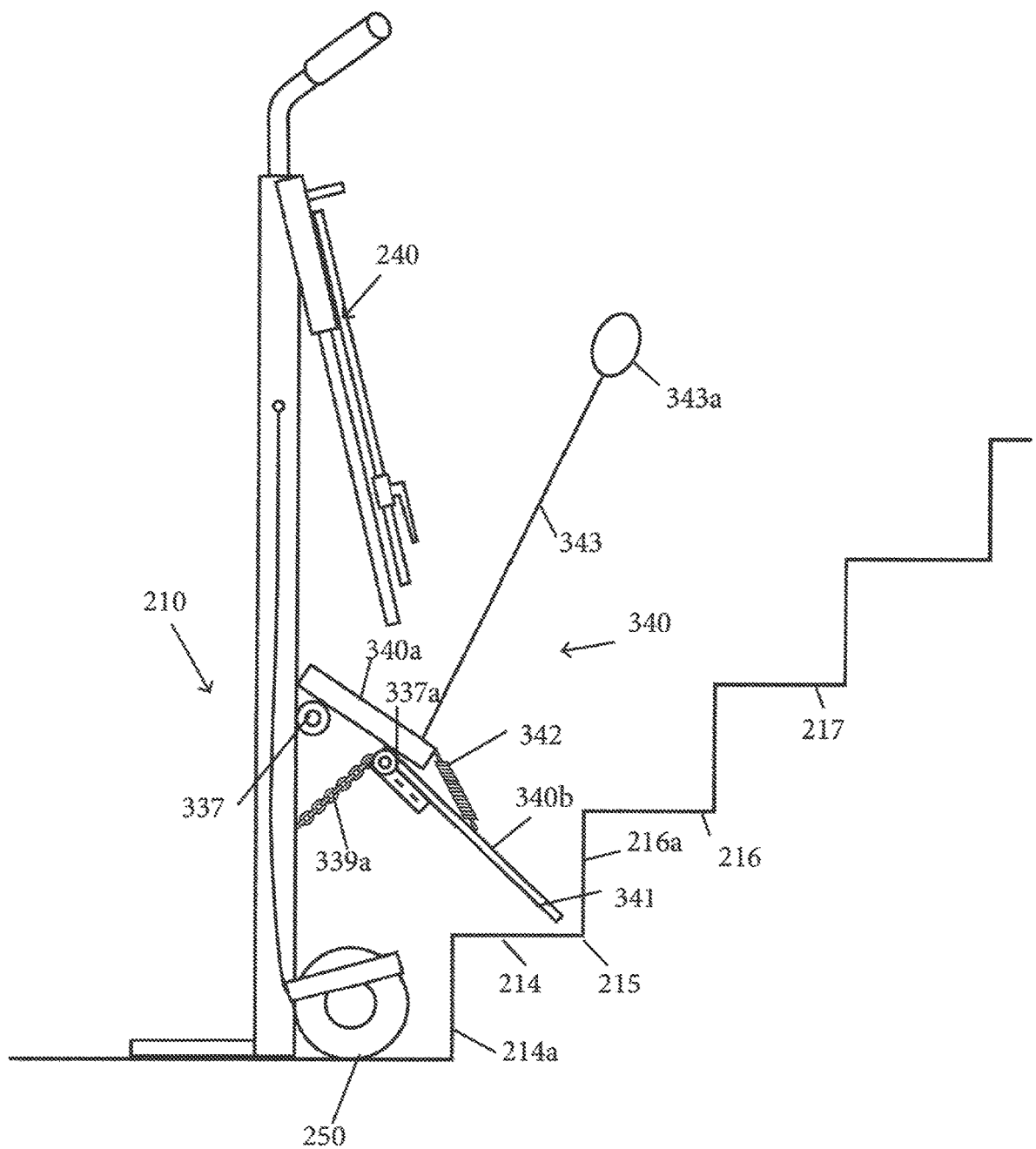

In an initial operation, shown in FIG. 23B, since movement of levering element 340b is blocked from lever positioning by riser 214a, the levering element 340b is folded relative to lifting member 340a via hinge 337a to an approximate vertical position and is lifted by lifting member 340a with control string 343 (and handle 343a) to clear the adjacent riser edge 214b. Chain 339 limits the lifting separation and spring 342 serves to return levering element 340b and lifting member 340a, after the lever 340 clears edge 214b, into original longitudinal alignment shown in FIG. 23C.

Figure 23D:
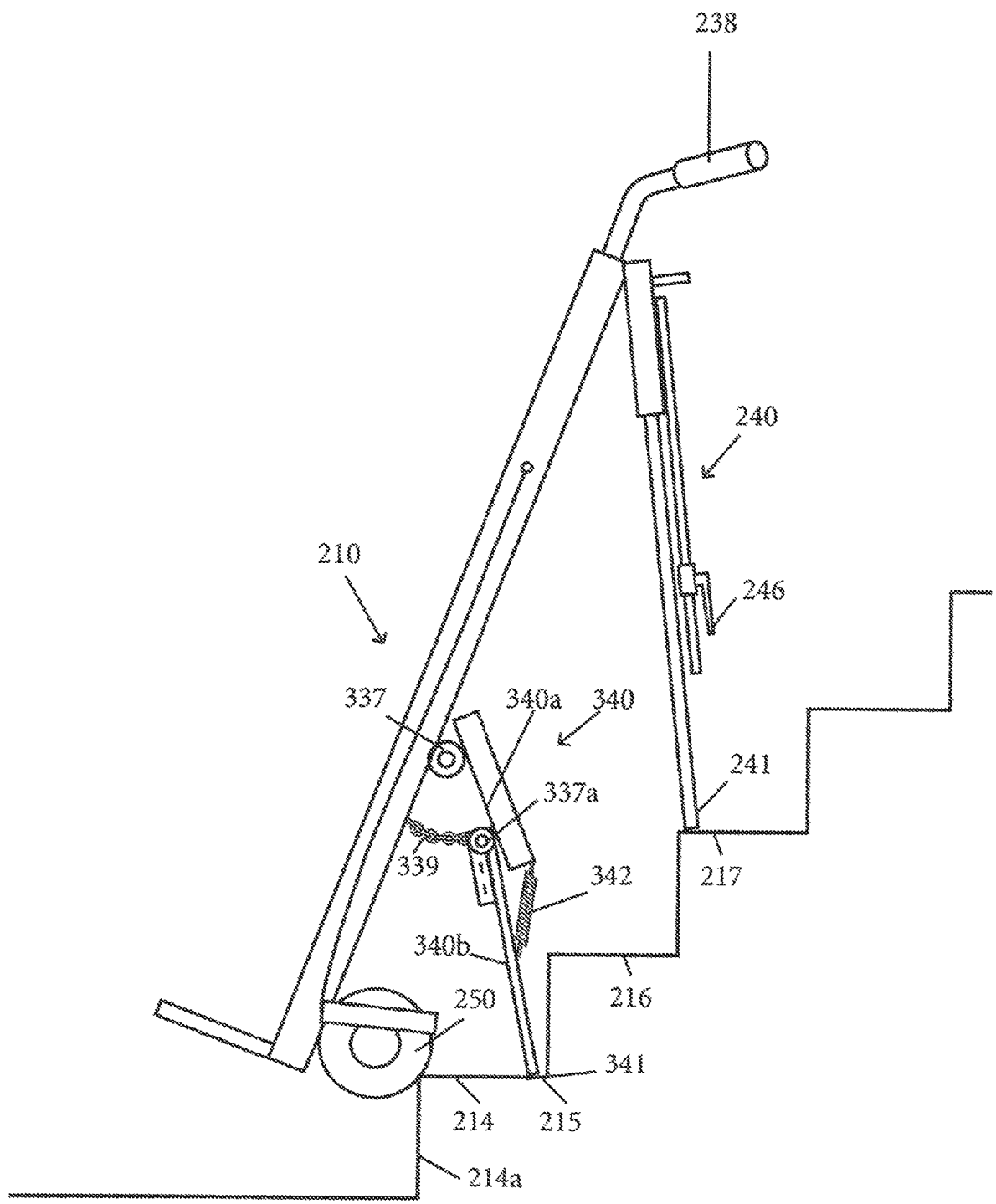
Figure 23E:
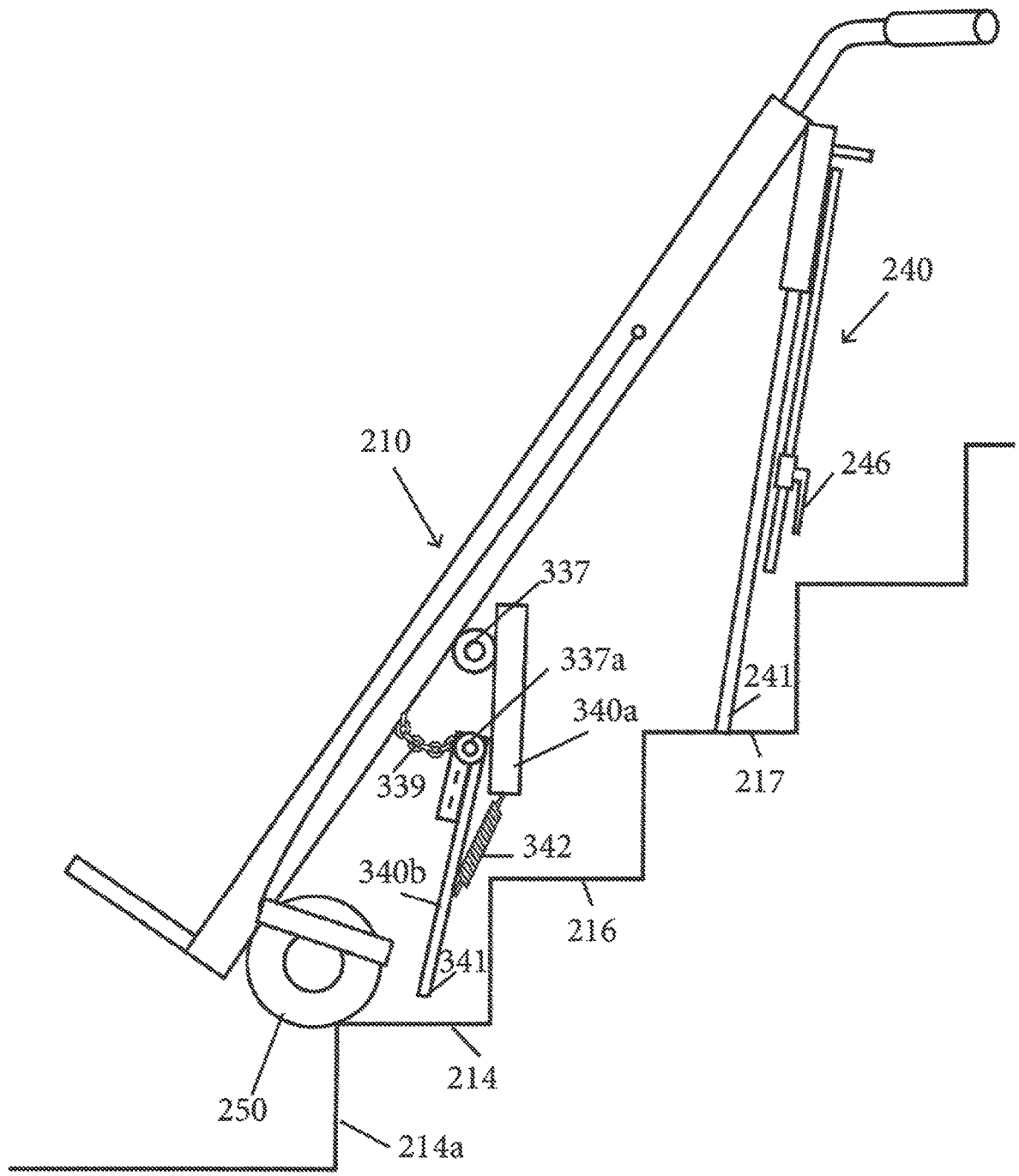

Thereafter, the lifting member 340a and levering element 340b and the end of the levering element 341 are brought into proximity to a junction 215 between step surface 214 and next riser 216a. As shown in FIG. 23D, the hand truck 210 is pivoted and levered about the levering element 340b with partial lifting of the load until the upper lever element 240 engages higher step planar surface 217 to provide a second continuing leverage until the hand truck clears the riser 214a and is moved to planar surface of step 214 as shown in FIG. 23E. Repetition, as with the prior embodiments, is effected with forward movement of the hand truck and collapsing of the elements to the position shown in FIG. 23A on each succeeding step.

It will be recognized by those skilled in the art that changes or modifications may be made to the above-described embodiments without departing from the broad inventive concepts of the invention. It should therefore be understood that this invention is not limited to the particular embodiments described herein but is intended to include all changes and modifications, as well as equivalently operatable elements, that are within the scope and spirit of the invention as defined in the claims. It is further understood that while the above description and drawings include prior art elements involved in the transport system, these are exemplified for modification of existing hand trucks. However, the structure and elements of the present invention are independently operable with or without the prior art elements.

What is claimed is:

1. A hand truck capable of being operated by a single user comprising:
   a) a frame having a first end and a second end;
   b) at least one handle adjacent the first end of the frame;
   c) at least one load supporting element extending from a front of the frame, proximate the second end, and configured for supporting a load;
   d) at least two wheels adjacent the second end of the frame and configured to support the frame and load supporting element for rolling movement; and
   e) a manual mechanism at the back of the frame configured to repeatedly be affected by a shift of a center of gravity of the load on the hand truck, the shift resulting from a force applied by the user, wherein, when the mechanism is subjected to a pressure of applied weight resulting from the shift of the center of gravity, backward toward the handle, the hand truck is caused to move backward, thereby facilitating lifting of the hand truck.

2. The hand truck of claim 1, wherein the hand truck further comprises a stabilizing support structure configured to support and stabilize the hand truck and a load carried thereby in a lifted position while the center of gravity is returned,
   wherein the stabilizing support structure comprises one of a shoe assembly pivotally connected to each side of the frame proximate the second end, each shoe assembly configured such that a shoe portion thereof is pivotal to a support position extending below a respective wheel and extending away from the frame; and an elongated triangular configuration positioned parallel to the frame and opposite the load, and wherein sides of the triangular configuration function as support surfaces, when the triangular configuration is rotated.

3. The hand truck of claim 2, with at least two wheels and when an axle connecting the wheels extends beyond the wheels with an extension, wherein the shoe assembly is supported on the extension of the axle.

4. The hand truck of claim 2, wherein each shoe is configured to fold up against the frame when the hand truck reaches a top step of stairs and a short landing whereby movement thereon is restricted by extended width of the hand truck with a carried load wider than the width of the hand truck.

5. The hand truck of claim 1, wherein the mechanism is affected by the shift of center of gravity comprises a lever member, optionally length adjustable, having a first end pivotally connected to the frame proximate the frame first end and a second free end; and wherein the free end of the lever member is configured to be positioned against a surface and the frame pivoted thereabout on the lever member.

6. The hand truck of claim 5, wherein the free end of the lever member comprises a movable boot member which maintains a position in line with the lever member when directly pressure engaged with a surface of a step and which is bendable and moves out of line with the lever member when it is disengaged from the surface and engaged with a riser of a step and wherein the movable boot member is deployable in line with the lever member and movable out of line with the lever member without removal of manual control of the handle by a user thereof.

7. The hand truck of claim 5, wherein the handle with focal hingedly attached elongated lever members is adjustable relative to a longitudinal height of the frame along a track in the frame.

8. The hand truck of claim 1, comprising:
1) an integral levering member which is deployable into a levering position for engaging with a higher level enabling the levered lifting of the hand truck and a load carried thereby from a first wheel support surface to a lifted position;
2) a stabilizing support structure configured to support and stabilize the hand truck and a load carried thereby in the lifted position while the integral levering member is lengthened with a releasable lengthening element for a second levered lifting to a second wheel support surface; and
3) a braking mechanism which engages wheels of the hand truck to prevent downward movement without impeding upward movement of the hand truck,
wherein the stabilizing support structure does not impede movement of the hand truck in an upward direction and wherein the integral levering member, the releasable lengthening element and stabilizing support structure are disengageable for repeated levering, lifting and supporting operations.

9. The hand truck of claim 1, wherein the hand truck comprises a position retaining structure that prevents return of the hand truck toward an original position when the mechanism enables lifting to less than a stabilized position whereby resetting return of the mechanism is effected without loss of an attained lifted position.

10. The hand truck of claim 1 wherein the mechanism that is affected by the shift of the center of gravity comprises an automatic activation structure which is capable of being reset with the return and subsequent shift of the center of gravity for further lifting, without an operator of the hand truck releasing the handles of the hand truck.

11. The hand truck of claim 1, wherein the hand truck has at least two wheels with at least one wheel comprises a stop brake structure with controlled wheel rolling configured to prevent wheel rolling in an undesired direction while allowing rolling in a desired direction.

12. The hand truck of claim 11, wherein the stop brake structure is configured to become automatically engaged with a wheel, with effected braking, and being pulled into the engagement with rotation of the wheel with the onset of wheel rolling in the undesired direction.

13. The hand truck of claim 11, wherein the stop brake structure is configured to be automatically activated simultaneously with the hand truck landing on a step during a hand truck descending movement.

14. The hand truck of claim 11, wherein the stop brake structure comprises a mechanism configured to control stop brake operation to brake as desired without manual control and wherein a stabilizer mechanism is provided which comprises a control mechanism that can activate or disable the stop brake structure when desired without need for an operator of the hand truck to release grip of handles of the hand truck.

15. The hand truck of claim 14, wherein a spring in a chain helps control deployment of the stop brake structure, wherein the stabilizer mechanism is deployed to lock the stop brake element when the stabilizer mechanism engages an edge of a step or an impeding section of a step and wherein the spring releases the stop brake when the stabilizer mechanism is moved away from the edge of the step or impeding section.

16. The hand truck of claim 1, wherein two sets of handles are adjacent the first end of the frame and spaced apart from each other along a length of the frame with the sets of handles being positioned and configured to facilitate handling and control of the hand truck during movement of the hand truck up and down stairs during transport of a load.

17. The hand truck of claim 1, wherein the hand truck further comprises a levering mechanism at the back of the frame configured to be deployed to be affected by a shift of a center of gravity of the load on the hand truck, wherein, when the mechanism is subjected to a pressure of applied weight resulting from sequential shifts of the center of gravity, backward toward the handle, the hand truck is caused to move backward, thereby facilitating lifting of the hand truck up above a first riser height and movement of the hand truck with supported load to a next stair or supporting surface.

18. The hand truck of claim 17, wherein the levering mechanism comprises at least two elongated lever members hingedly attached to the frame at a rear thereof, wherein the lever members are successively distanced from the frame and wherein height of the lever members is successively shorter whereby the elongated lever members are able to engage successive upper surfaces of stairs to effect simultaneous or sequential levered lifting of the hand truck with supported loads above the first riser height.

19. The hand truck of claim 17, wherein the levering mechanism comprises three elongated lever members hingedly attached to the rear of the frame at a focal position proximate to the at least one handle and wherein each of the elongated lever members optionally comprises a height adjustment structure to permit adjustment of the height of the respective lever members to engage the successive upper surfaces of the stairs to effect the simultaneous or sequential levered lifting.

20. A stop brake structure for a wheeled device, the stop brake structure comprising controlled wheel rolling configured to prevent wheel rolling in an undesired direction while allowing rolling in a desired direction, wherein the stop brake structure is configured to become automatically engaged with a wheel, with effected braking, and being pulled into the engagement with rotation of the wheel, with the onset of wheel rolling in the undesired direction with the stop brake being configured to be automatically activated with a mechanism configured to control stop brake operation of the structure to brake as desired, with or without manual control, wherein the stop brake structure comprises a stabilizer mechanism with a control mechanism that can activate or disable the stop brake structure on a wheeled device having controlling element, when desired, without need for an operator of the wheeled device to release grip of the controlling element.

21. The stop brake structure of claim 20, wherein the stabilizer mechanism comprises a levered element, positioned on the braking mechanism, having a protrusion at one end, which is inserted into a spring controlled chain, and a free levering second end, the levering second end being configured to engage a stair edge or an impeding section of a step and be lifted thereby, whereby, when the levering second end is lifted, the protrusion pushes the chain and brake into braking position and wherein release of the levering end, from being lifted, effects release of the braking mechanism from the braking position.

22. A hand truck for facilitated lifting of loads up steps of a staircase, each having a riser height, the hand truck comprising:
    a) a frame having a first end and a second end;
    b) at least one handle adjacent the first end of the frame;
    c) at least one load supporting element extending from a front of the frame, proximate the second end, and configured for supporting a load;
    d) optionally at least two wheels adjacent the second end of the frame and configured to support the frame and load supporting element for rolling movement;
    wherein the hand truck further comprises a separated levering mechanism at the back of the frame configured to be deployed to be affected by a shift of a center of gravity of the load on the hand truck, wherein, when the mechanism is subjected to a pressure of applied weight resulting from sequential shifts of the center of gravity, backward toward the handle, the hand truck is caused to move backward, thereby facilitating lifting of the hand truck up above a first riser height of a step and movement of the hand truck with supported load to a next step or supporting surface, wherein the levering mechanism comprises:
    i) an upper lever element hingedly attached to the frame proximate to its upper end and adjacent to the at least one handle;
    ii) a lower levering element proximate to its lower second end; and
    iii) a lifting element hingedly attached to the lower second end of the frame and the lower levering element hingedly attached thereto, whereby the lifting element is configured to sufficiently lift the lower levering element to clear an adjacent riser of the first riser height and to enable the levering element to assume a levering configuration.

23. The hand truck of claim 22, wherein the levering element is positioned at a lower portion of the height of the frame from the second end and wherein the levering element comprises a mechanism to enable the levering element to be raised from step to step toward a junction between a step surface and a following riser while enabling the levering element to avoid blockage with by a riser proximate to the levering element.

24. A mechanical method for enhancing the capacity of a hand truck, in being able to move large capacity weight loads up stairs and controllably down stairs, when operated by a single user, the hand truck being comprised of a supporting frame with first and second ends, with a controlling handle at the first end and a load support load supporting element at a second end, the method comprising the steps of:
    a) providing a lever member having a first end pivotally connected to the first end of the frame, at a first end of the lever member with a second end of the lever member being free, wherein the free end of the lever member is configured to be positioned against a surface and the frame pivoted thereabout on the lever member, wherein the free end of the lever member comprises a movable boot member which maintains a position in line with the lever member when directly pressure engaged with a surface of a step and which is bendable and moves out of line with the lever member when it is disengaged from the surface and engaged with a riser of a step and wherein the movable boot member is deployable in line with the lever member and movable out of line with the lever member without removal of manual control of the handle by a user thereof;
    b) providing the hand truck with an engageable and disengageable intermediate weight support or position stabilizer which is configured to be deployable after initial levered lifting to permit the integral hinged lever member to be disengaged for elongation without downward movement of the hand truck, to provide subsequent additional levered lifting; and
    c) providing the hand truck with an engageable and disengageable braking structure configured to retard downward movement of the hand truck during upward movement of the hand truck and to control downward movement.

25. The method of claim 24 further comprising the steps of:
    i. the hand truck on a surface or planar area adjacent a first stair into proximity to a riser of the first stair;
    ii. extending the integral hinged elongatable lever member away from the hand truck with the free end brought into supporting engagement with a step section of a higher second stair and using the lever member as a lever to raise the load against the riser of the first stair;
    iii. deploying a load support structure to hold the load in place while the lever member is elongated for additional leveraged lifting capability;
    iv. using the extended lever member to lever and lift the hand truck from its load support holding place to permit the wheels of the hand truck to move further upward and onto the step of the second stair;
    v. returning the lever member to its original length with release of load pressure; and
    vi. repeating steps ii to v until the hand truck clears the top stair and onto a landing and wherein the braking structure prevents unwanted back movement during the upward stair movement.

* * * * *